US011064192B2

(12) United States Patent
Han et al.

(10) Patent No.: US 11,064,192 B2
(45) Date of Patent: Jul. 13, 2021

(54) SIMPLIFICATION OF SPATIAL-TEMPORAL MOTION VECTOR PREDICTION

(71) Applicant: QUALCOMM Incorporated, San Diego, CA (US)

(72) Inventors: Yu Han, San Diego, CA (US); Han Huang, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/592,005

(22) Filed: Oct. 3, 2019

(65) Prior Publication Data

US 2020/0112716 A1   Apr. 9, 2020

Related U.S. Application Data

(60) Provisional application No. 62/741,413, filed on Oct. 4, 2018.

(51) Int. Cl.
*H04N 19/176* (2014.01)
*H04N 19/159* (2014.01)
*H04N 19/137* (2014.01)
*H04N 19/105* (2014.01)

(52) U.S. Cl.
CPC ......... *H04N 19/105* (2014.11); *H04N 19/137* (2014.11); *H04N 19/159* (2014.11); *H04N 19/176* (2014.11)

(58) Field of Classification Search
CPC .. H04N 19/105; H04N 19/137; H04N 19/159; H04N 19/176; H04N 19/109; H04N 19/52

USPC ..................................................... 375/240
See application file for complete search history.

(56) References Cited

U.S. PATENT DOCUMENTS

2017/0238005 A1* 8/2017 Chien ................. H04N 19/176
                                                      375/240.16

OTHER PUBLICATIONS

Lee et al., "CE4-related: Composite merge candidate", Oct. 8-12, 2018, Joint Video Experts Team (JVET) of ITU-T SG 16 WP 3 and ISO/IEC JTC 1/SC 29/WG 11, JVET-L0144_r2, 3 pages (Year: 2018).*
Paluri et al., "CE4-related: Merge List Simplification", Oct. 8-12, 2018, Joint Video Experts Team (JVET) of ITU-T SG 16 WP 3 and ISO/IEC JTC 1/SC 29/WG 11, JVET-L0282, 5 pages (Year: 2018).*
Léannec et al., "CE4-related—simplified non-sub-block STMVP", Oct. 3-12, 2018, Joint Video Experts Team (JVET) of ITU-T SG 16 WP 3 and ISO/IEC JTC 1/SC 29/WG 11, JVET-L0207-v1, 11 pages (Year: 2018).*

(Continued)

*Primary Examiner* — Christopher S Kelley
*Assistant Examiner* — Asmamaw G Tarko
(74) *Attorney, Agent, or Firm* — Shumaker & Sieffert, P.A.

(57) ABSTRACT

A device and method for coding video data determines a spatial-temporal motion vector predictor (STMVP) so that the STMVP does not need to be motion vector scaled. The device may determine a candidate list. The device may then determine which candidates in the candidate list have the same reference picture. The device may then generate the STMVP based on the candidates in the candidate list determined to have the same reference picture. The device may then code a current block of video data using the STMVP.

28 Claims, 15 Drawing Sheets

(56) References Cited

OTHER PUBLICATIONS

Bordes, et al., "Description of SDR, HDR and 360 Video Coding Technology Proposal by Qualcomm and Technicolor-Medium Complexity Version," JVET-J0022r1, 10th Meeting; San Diego, US, Apr. 10-20, 2018 (The Joint Video Exploration Team of ISO/IEC JTC1/SC29/WG11 and ITU-T SG.16); 84 pp.

Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20 , 2018 (The Joint Video Exploration Team of ISO/IEC JTC1/SC29/WG11 and ITU-T SG.16); URL: http://phenix.int-evry.fr/jvet/, pp. 1-43.

Zhou T., et al., "Spatial-temporal merge mode (non subblock STMVP)", 11. JVET Meeting; Jul. 10, 2018-Jul. 18, 2018; Ljubljana, Si (The Joint Video Exploration Team of ISO/IEC JTC1/SC29/WG11 and ITU-T SG.16), No. JVET-K0532 _r2, Jul. 13, 2018 (Jul. 13, 2018), XP030199702, Retrieved from the Internet: URL:http://phenix.int-evry.fr/jvet/doc_end_user/documents/11_Ljubljana/wg11/JVET-K0532-v1.zip JVETK0532_K0161_r2.doc [retrieved on Jul. 13, 2018], section 2.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "High Efficiency Video Coding (HEVC) text specification draft 10 (for FDIS & Consent)," Joint collaborative Team on Video Coding (JCT-VC) of ITU-T SG 16 WP 3 and ISO/IEC JTC 1/SC 29/WG 11, Document: JCTVC-L1003_v34, 12th Meeting: Geneva, Ch, Jan. 14-23, 2013, 310 pages.

Bross B., et al., "Versatile Video Coding (Draft 2)", 11. JVET Meeting; Jul. 10, 2018-Jul. 18, 2018; Ljubljana, SI (The Joint Video Exploration Team of ISO/IEC JTC1/SC29/WG11 and ITU-T SG.16), No. JVET-K1001, Sep. 21, 2018 (Sep. 21, 2018), XP030193577, 135 Pages, Retrieved from the Internet: URL: http://phenix.int-evry.fr/jvet/doc_end_user/documents/11_Ljubljana/wg11/JVET-K1001-v6.zip JVET-K1001-v6.docx [retrieved on Sep. 21, 2018] paragraph 8.2.4.2-paragraph 8.2.4.2.9; figures 8-1, tables 8-5.

Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et a., "Algorithm Description of Joint Exploration Test Model 1," 1, JVET Meeting; Oct. 19, 2015-Oct. 21, 2015; Geneva, CH (The Joint Video Exploration Team of ISO/IEC JTC1/SC29/WG11 and ITU-T SG.16 ); URL: http://phenix.int-evry.fr/jvet/, No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-v1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, IT, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

Chien W-J., et al., "CE4-related: Modification on History-based Mode Vector Prediction", 12. JVET Meeting, Oct. 3, 2018-Oct. 12, 2018, Macao, CN (The Joint Video Exploration Team of ISO/IEC JTC1/SC29/WG11 and ITU-T SG.16), No. JVET-L0401, Oct. 5, 2018 (Oct. 5, 2018), XP030194900, 5 Pages, Retrieved from the Internet: URL: http://phenix.int-evry.fr/jvet/doc_end_user/documents/12_Macao/wg11/JVET-L0401-v4.zip JVET-L0401_r3.docx [retrieved on Oct. 5, 2018] abstract section 2 with its sub-section.

Ergen S., "ZigBee/IEEE 802.15.4 Summary", Sep. 10, 2004, 37 Pages.

Han (QUALCOMM) Y., et al., "CE4.2.3: Improvement on Merge/Skip Mode", 11. JVET Meeting; Jul. 11, 2018-Jul. 18, 2018; Ljubljana, SI (The Joint Video Exploration Team of ISO/IEC JTC1/SC29/WG11 and ITU-T SG.16), No. JVET-K0339, Jul. 7, 2018 (Jul. 7, 2018), 7 Pages, XP030199065, Retrieved from the Internet: URL: http://phenix.int-evry.fr/jvet/doc_end_user/documents/11_Ljubljana/wg11/JVET-K0339-v2.zip JVET-K0339_v2.docx [retrieved on Jul. 7, 2018] Section 2.

Han Y., et al., "CE4.2.16: Sub-block merge candidates in BMS and JEM," Joint Video Exploration Team (JVET) of ITU-T SG 16 WP 3 and ISO/IEC JTC 1/SC 29/WG 11, JVET-K0338, 11th Meeting: Ljubljana, SI, Jul. 10-18, 2018, pp. 1-5.

Han Y., et al., "CE4.4.6: Improvement on Merge/Skip mode," Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.

Han Y., et al., "CE4-related: Improvement on Merge/Skip mode with line buffer restriction", Joint Video Exploration Team (JVET) of ITU-T SG 16 WP 3 and ISO/IEC JTC 1/SC 29/WG 11, JVET-K0350-V6 , Jul. 10-18, 2018, 6 pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/054747—ISA/EPO—dated Jan. 7, 2020, 15 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H265, "Series H: Audiovisual and Multimedia Systems, Infrastructure of audiovisual services—Coding of moving video, High efficiency video coding," The International Telecommunication Union. Dec. 2016, 664 Pages.

Le Leannec (Technicolor) F., et al., "CE4 related: aimplified non-sub-block STMVP",12.JVET Meeting; Oct. 3, 2018-Oct. 12, 2018; Macao, CN (The Joint Video Exploration Team of ISO/IEC JTC1/SC29/WG11 and ITU-T SG.16), No. JVET-L0207, Oct. 3, 2018 (Oct. 3, 2018), XP030194461, Retrieved from the Internet: URL: http://phenix.int-evry.fr.jvet/doc_end_user/documents/12_Macao/wg11//JVET-L0207-v2.zip , JVET-L0207-v2-0.5.docx, [retrieved on Oct. 3, 2018], pp. 1-11, Section 4.

Lee (LGE) J., et al., "CE4-related: Composite merge candidate", 12.JVET Meeting; Oct. 3, 2018-Oct. 12, 2018; Macao; (The Joint Video Exploration Team of ISO/IEC JTC1/SC29/WG11 and ITU-T SG.16), No. JVET-L0144, Oct. 1, 2018 (Oct. 1, 2018), XP030194160, Retrieved from the Internet: URL: http://phenix.int-evry.fr/jvet/doc_end_user/documents/12_Macao/wg11/JVET-L0144-v2.zip, JVET-L0144_r2.docx, 3 Pages, [retrieved on Oct. 1, 2018], Section 1.

Paluri (LGE) S., et al., "CE4-Related: Merge List Simplification", 12.JVET Meeting; Oct. 3, 2018-Oct. 12, 2018; Macao, CN (The Joint Video Exploration Team of ISO/IEC JTC1/SC29/WG11 and ITU-T SG.16), No. JVET-L0282, Oct. 3, 2018 (Oct. 3, 2018), XP030194471, Retrieved from the Internet: URL: http://phenix.int-evry.fr/jvet/doc_end_user/documents/12_Macao/wg11/JVET-L0282-v2.zip , JVET-L0282.docx, 4 Pages, [retrieved on Oct. 3, 2018], Section 1, 2,.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

* cited by examiner

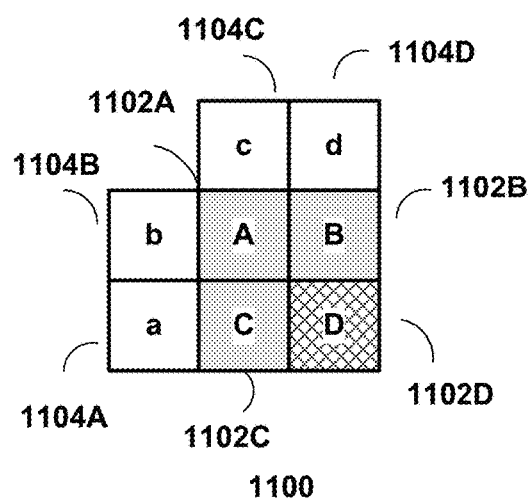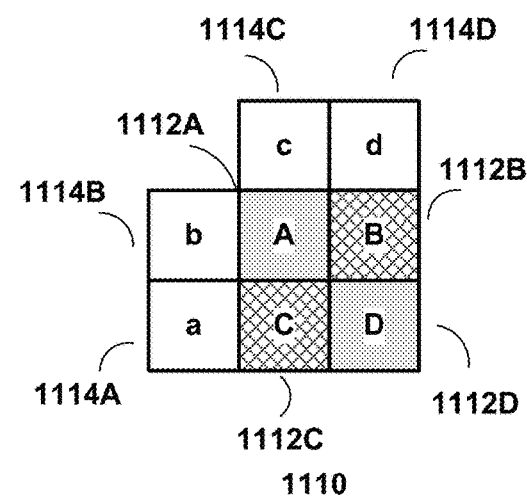
FIG. 11A
FIG. 11B

SIMPLIFICATION OF SPATIAL-TEMPORAL MOTION VECTOR PREDICTION

This application claims the benefit of U.S. Provisional Patent Application 62/741,413, filed Oct. 4, 2018, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction in video coding. Techniques of this disclosure may be applied to any of the existing video codecs, such as HEVC (High Efficiency Video Coding) or be an efficient coding tool in any future video coding standards, such as H.266/VVC (Versatile Video Coding).

In one example, this disclosure describes a method of coding video data, the method comprising: generating a candidate list; determining whether two or more candidates in the candidate list that have a same reference picture; generating a spatial-temporal motion vector predictor (STMVP) based on the two or more candidates in the candidate list that have the same reference picture; and coding a current block of the video data using the STMVP.

In another example, this disclosure describes a device for coding video data comprising: a memory configured to store a current block of the video data; and one or more processors coupled to the memory, the one or more processors configured to: generate a candidate list; determine whether two or more candidates in the candidate list that have a same reference picture; generate a spatial-temporal motion vector predictor (STMVP) based on the two or more candidates in the candidate list that have the same reference picture; and code the current block of the video data using the STMVP.

In another example, this disclosure describes a computer-readable storage medium having stored thereon instructions that, when executed, cause one or more processors to: generate a candidate list; determine whether two or more candidates in the candidate list that have a same reference picture; generate a spatial-temporal motion vector predictor (STMVP) based on the candidates in the candidate list determined to have the same reference picture; and code a current block of video data using the STMVP.

In yet another example, this disclosure describes a device for coding video data comprising: means for generating a candidate list; means for determining whether two or more candidates in the candidate list have a same reference picture; means for generating a spatial-temporal motion vector predictor (STMVP) based on the two or more candidates in the candidate list that have the same reference picture; and means for coding a current block of the video data using the STMVP.

The details of one or more examples are set forth in the accompanying drawings and the description below. Other features, objects, and advantages will be apparent from the description, drawings, and claims.

BRIEF DESCRIPTION OF DRAWINGS

FIG. 11A is a conceptual diagram illustrating an example of one PU with four sub-blocks and its neighboring blocks.

FIG. 11B is a conceptual diagram illustrating an example of one PU with four sub-blocks and its neighboring blocks.

DETAILED DESCRIPTION

In general, this disclosure techniques related to spatial-temporal motion vector prediction for video coding. For example, this disclosure describes techniques for selecting a spatial-temporal motion vector predictor (STMVP) so that motion vector scaling of the STMVP is not necessary. In current implementations, a video coding device may select a motion vector predictor that has a different reference picture than a current block of video data. In such cases, the motion vector predictor must be scaled to point to the reference picture of the current block of video data. The techniques of this disclosure may be applied to existing video codecs, such as HEVC (High Efficiency Video Coding), or may be applied to coding tools in future video coding standards. Specifically, a video coding device generates a candidate list. The video coding device determines which candidates in the candidate list have the same reference pictures. The video coding device then generates the STMVP based on the candidates in the candidate list determined to have the same reference pictures. For example, the video coding device may select one or more candidates that have the same reference picture as a temporal motion vector predictor (TMVP) and average them to create the STMVP. The video coding device then codes the current block of video data using the STMVP.

In existing video coding standards, encoders and decoders select the STMVP without regard for whether or not motion vector scaling operations will be necessary when using the STMVP. Motion vector scaling operations add complexity to the encoder and decoder and increase encoding and decoding time. As such, the techniques of this disclosure may enable a video coding device to avoid motion vector scaling operations on the STMVP. Rather, as described in this disclosure, the video coding device may generate a candidate list and determine whether two or more candidates in the candidate list have the same reference pictures. If two or more candidates in the candidate list have the same reference picture, the video coding device may generate the STMVP based on the two or more candidates in the candidate list that have the same reference pictures. The video coding device may then code the current block of video data using the STMVP. However, when the video coding device determines that there are no two candidates in the candidate list that have the same reference picture, the video coding device does not generate the STMVP based on two or more candidates in the candidate list. In this way, the video coding device may avoid performance of the motion vector scaling operations that may slow down the process of generating the candidate list.

Figure 1:
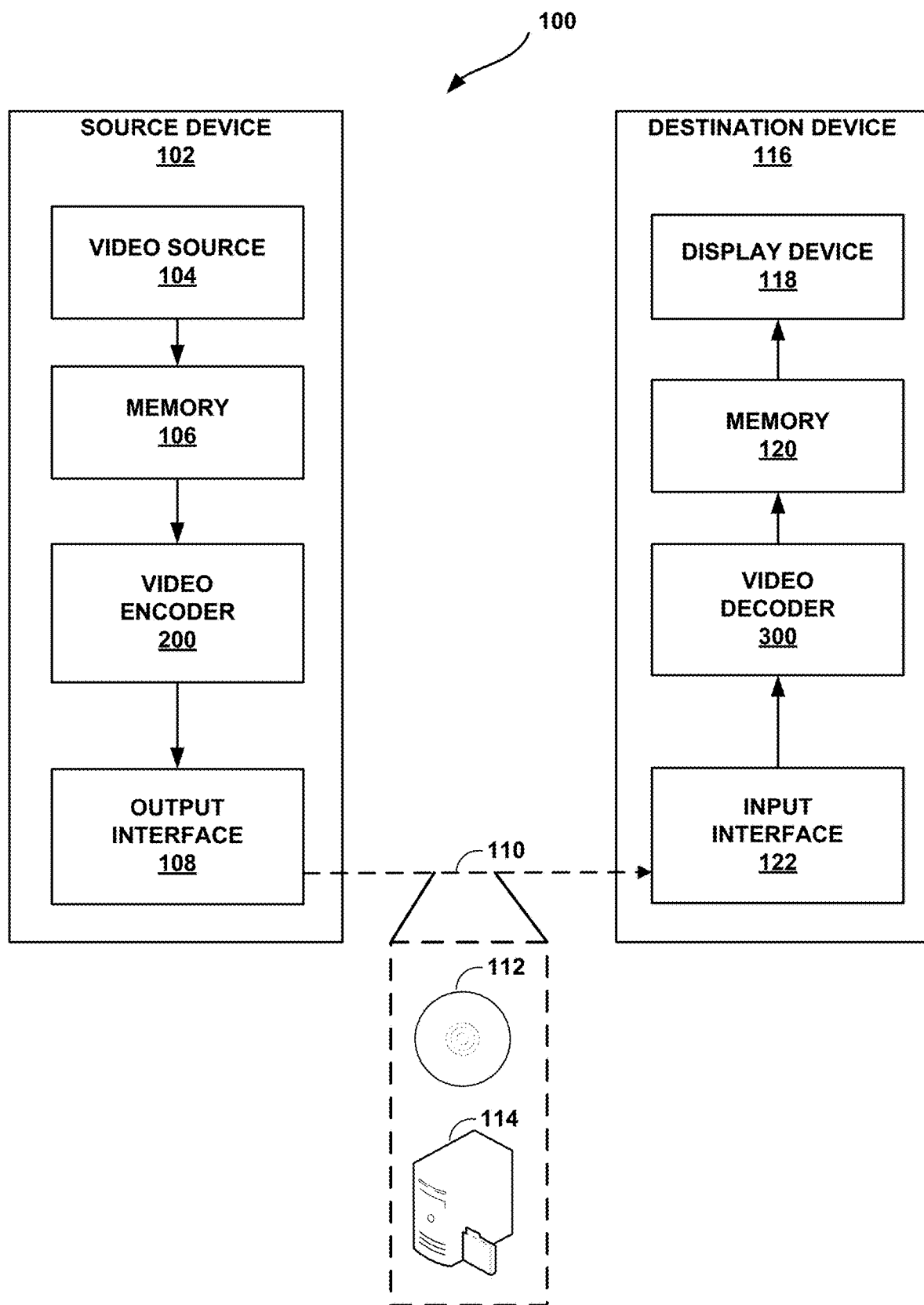
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for video coding described in this disclosure. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coding video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data.

Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream from computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM), VVC, or VVC test mode (VTM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

As mentioned above, a video coder (e.g., video encoder 200 or video decoder 300) may apply inter prediction to generate a prediction block for a video block of a current picture. For instance, the video coder may apply inter prediction to generate a prediction block of a CU. If the video coder applies inter prediction to generate a prediction block, the video coder generates the prediction block based on decoded samples of one or more reference pictures. Typically, the reference pictures are pictures other than the current picture. In some video coding specifications, a video coder may also treat the current picture itself as a reference picture. The video coder may determine one or more reference picture lists. Each of the reference picture lists includes zero or more reference pictures. One of the reference picture lists may be referred to as Reference Picture List 0 (RefPicList0) and another reference picture list may be referred to as Reference Picture list 1 (RefPicList1). For ease of explanation, this disclosure may refer to Reference Picture List 0 as list 0 and may refer to Reference Picture List 1 as list 1.

The video coder may apply uni-directional inter prediction or bi-directional inter prediction to generate a prediction block. When the video coder applies uni-directional inter prediction to generate a prediction block for a video block, the video coder determines a single reference block for the video block based on a samples of a single reference picture. The reference block may be a block of samples that is similar to the prediction block. Furthermore, when the video coder applies uni-directional inter prediction, the video coder may set the prediction block equal to the reference block. When the video coder applies bi-directional inter prediction to generate a prediction block for a video block, the video coder determines two reference blocks for the video block. In some examples, the two reference blocks are in reference pictures in different reference picture lists. Additionally, when the video coder applies bi-direction inter-prediction, the video coder may determine the prediction block based on the two reference blocks. For instance, the video coder may determine the prediction block such that each sample of the prediction block is a weighted average of corresponding samples of the two reference blocks. Reference list indicators may be used to indicate which of the reference picture lists include reference pictures used for determining reference blocks.

As mentioned above, a video coder may determine a reference block based on samples of a reference picture. In some examples, the video coder may determine the reference block such that each sample of the reference block is equal to a sample of the reference picture. In some examples, as part of determining a reference block, the video coder may interpolate samples of the reference block from samples of the reference picture. For example, the video coder may determine that a sample of the prediction block is a weighted average of two or more samples of the reference picture.

In some examples, when video encoder 200 performs uni-directional inter prediction for a current block of a current picture, video encoder 200 identifies a reference block within one or more reference pictures in one of the reference picture lists. For instance, video encoder 200 may search for a reference block within the one or more reference pictures in the reference picture list. In some examples, video encoder 200 uses a mean squared error or other metric to determine the similarity between the reference block and the current block. Furthermore, video encoder 200 may determine motion parameters for the current block. The motion parameters for the current block may include a motion vector and a reference index. The motion vector may indicate a spatial displacement between a position of the current block within the current picture and a position of the reference block within the reference picture. The reference index indicates a position within the reference picture list of the reference frame that contains the reference picture list. The prediction block for the current block may be equal to the reference block.

When video encoder 200 performs bi-directional inter prediction for a current block of a current picture, video encoder 200 may identify a first reference block within reference pictures in a first reference picture list ("list 0") and may identify a second reference block within reference pictures in a second reference picture list ("list 1"). For instance, video encoder 200 may search for the first and second reference blocks within the reference pictures in the first and second reference picture lists, respectively. Video encoder 200 may generate, based at least in part on the first and the second reference blocks, the prediction block for the current block. In addition, video encoder 200 may generate a first motion vector that indicates a spatial displacement between the current block and the first reference block. Video encoder 200 may also generate a first reference index that identifies a location within the first reference picture list of the reference picture that contains the first reference block. Furthermore, video encoder 200 may generate a second motion vector that indicates a spatial displacement between the current block and the second reference block. Video encoder 200 may also generate a second reference index that identifies a location within the second reference picture list of the reference picture that includes the second reference block.

When video encoder 200 performs uni-directional inter prediction on a current block, video decoder 300 may use the motion parameters of the current block to identify the reference block of the current block. Video decoder 300 may then generate the prediction block of the current block based on the reference block. When video encoder 200 performs bi-directional inter prediction to determine a prediction block for a current block, video decoder 300 may use the motion parameters of the current block to determine two reference blocks. Video decoder 300 may generate the prediction block of the current block based on the two reference samples of the current block.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
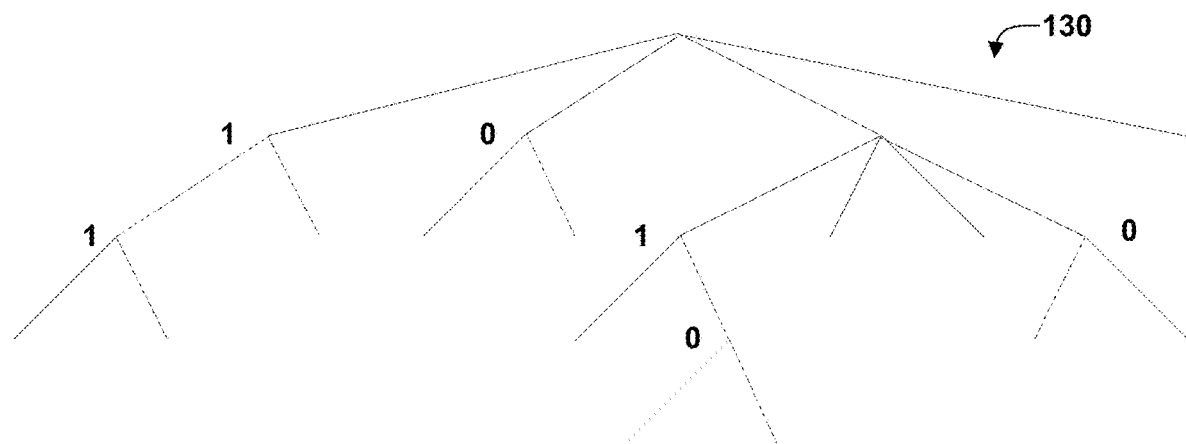
FIGS. 2A and 2B are conceptual diagrams illustrating an example quadtree binary tree (QTBT) structure, and a corresponding coding tree unit (CTU).
Figure 2B:
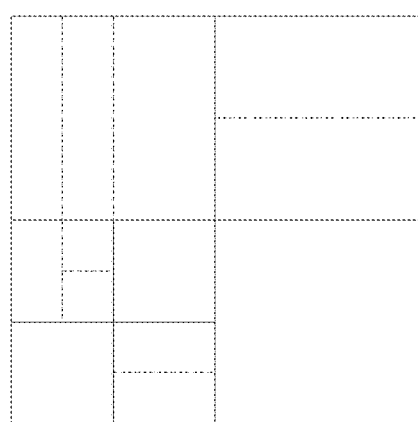

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
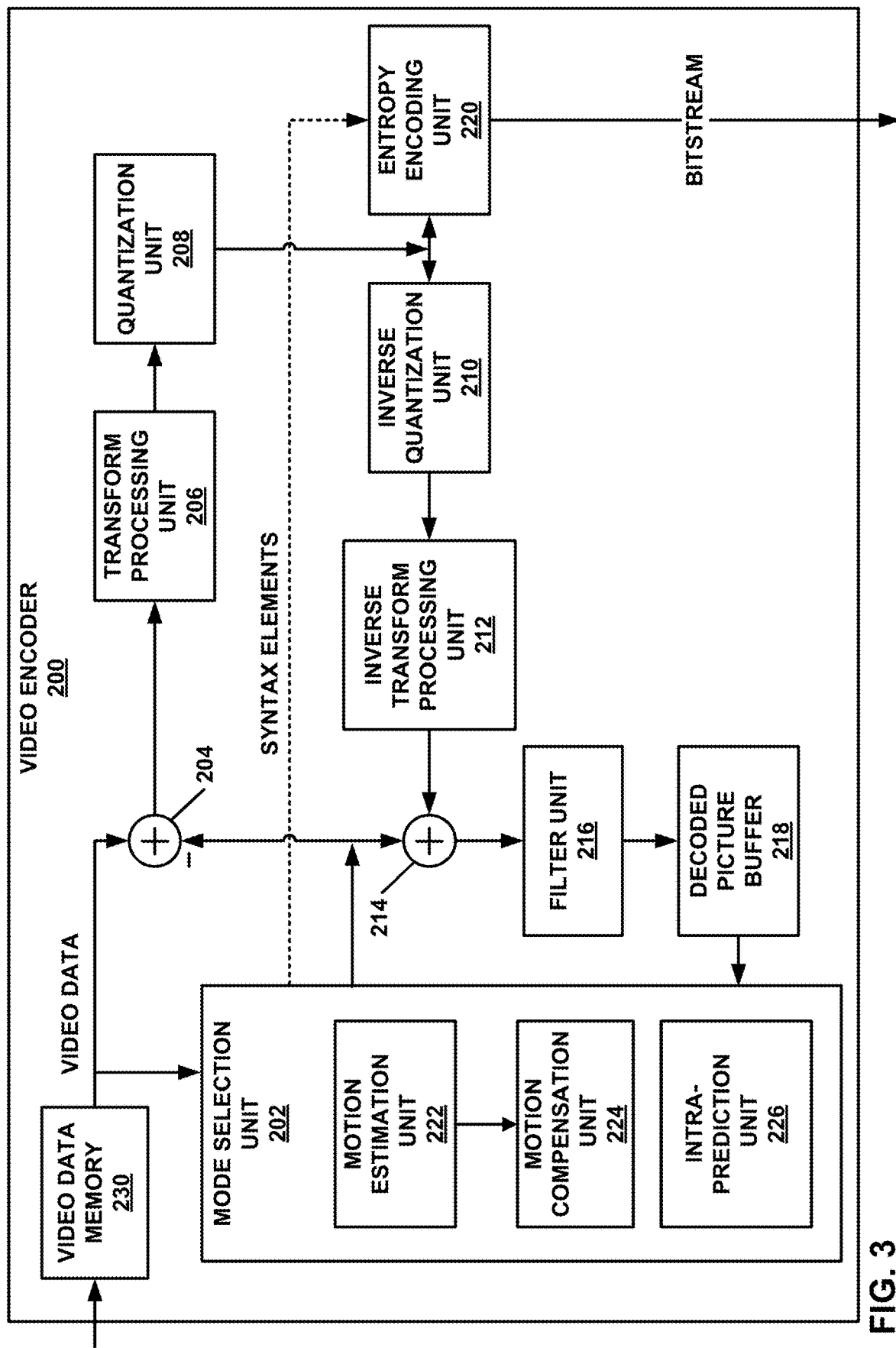
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data. Video encoder 200 includes a memory configured to store video data (e.g., video data memory 230). Video encoder 200 also includes and one or more processing units implemented in circuitry (e.g., motion estimation unit 222). Video encoder 200 (e.g., motion estimation unit 222) may be configured to generate a candidate list and determine whether two or more candidates in the candidate list have the same reference pictures. Video encoder 200 (e.g., motion estimation unit 222) may be configured to generate a spatial-temporal motion vector predictor (STMVP) based on the two or more candidates in the candidate list that have the same reference pictures. Video encoder 200 may also be configured to encode a current block of the video data using the STMVP.

Figure 4:
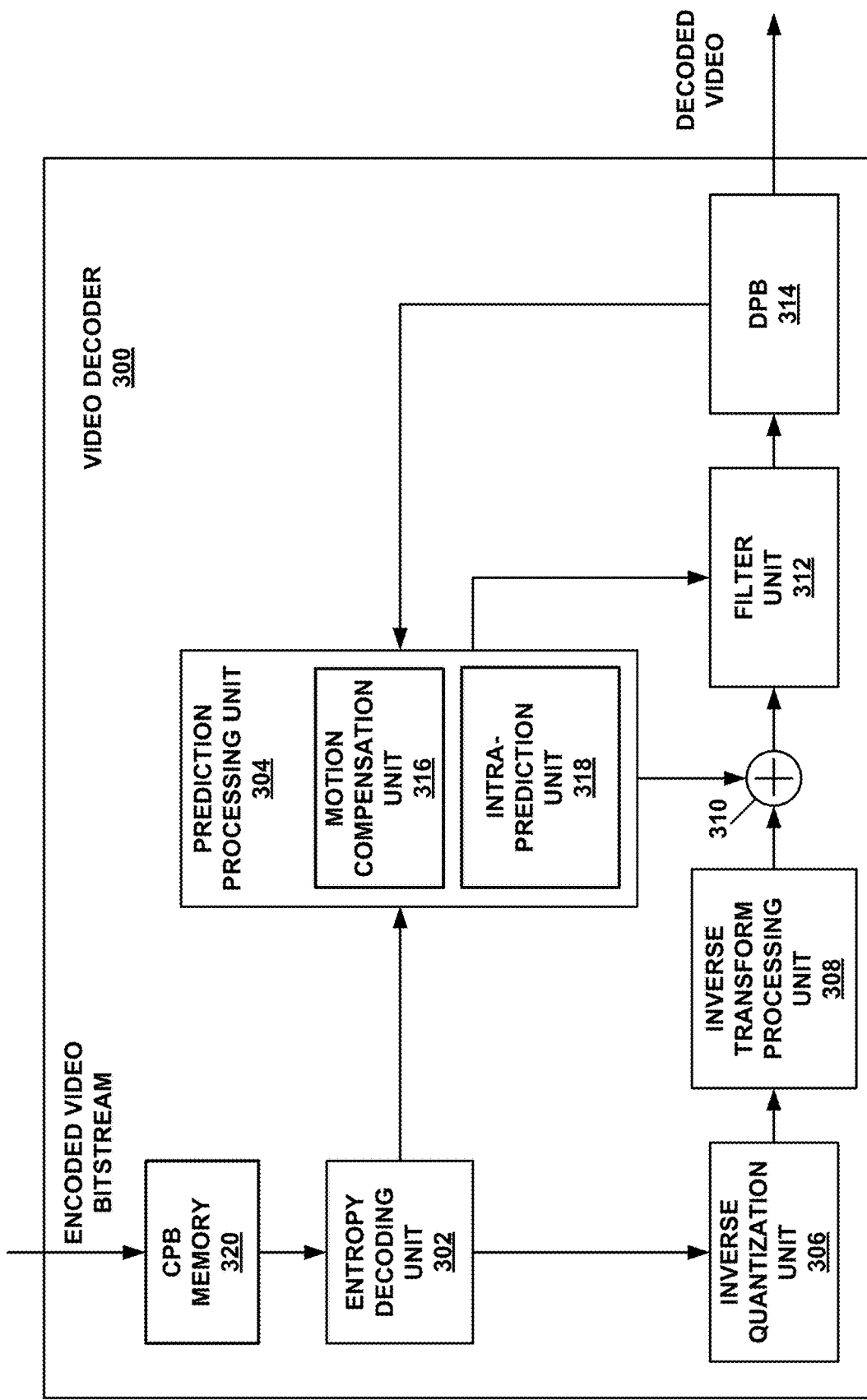
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of HEVC and the H.266 video coding standard in development. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and may entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device configured to decode video data. Video decoder 300 includes a memory (e.g., CPB memory 320) configured to store video data. Video decoder 300 includes one or more processing units implemented in circuitry (e.g., motion compensation unit 316). Video decoder 300 (e.g., motion compensation unit 316) may be configured to generate a candidate list and determine whether two or more candidates in the candidate list have the same reference pictures. Video decoder 300 (e.g., motion compensation unit 316) may also generate a STMVP based on the two or more candidates in the candidate list that have the same reference pictures. Video decoder 300 may decode a current block of the video data using the STMVP.

Figure 5:
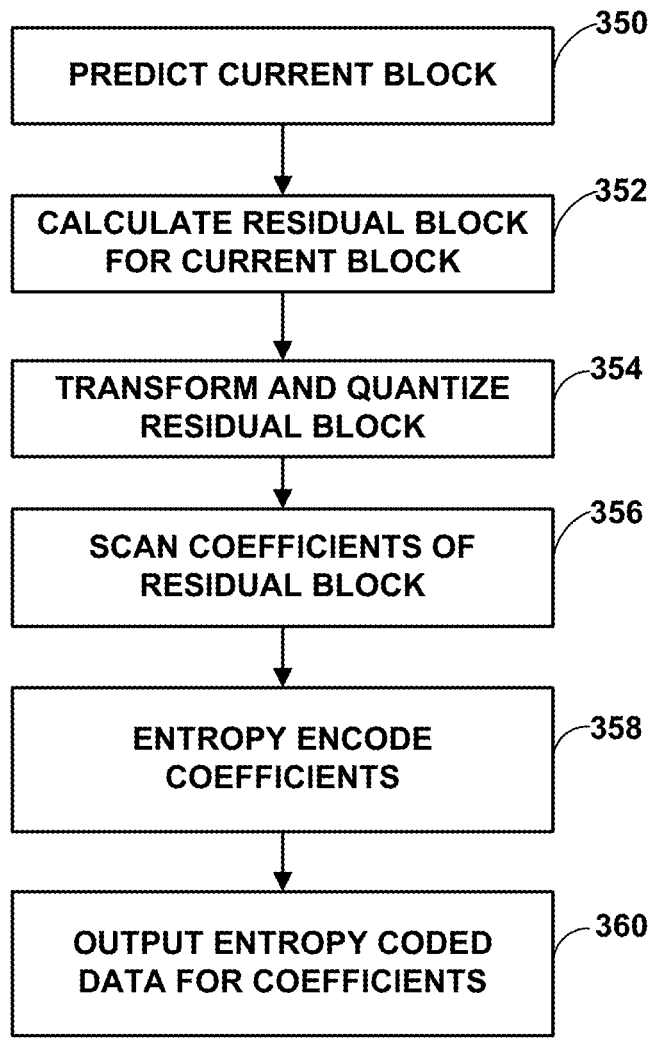
FIG. 5 is a flowchart illustrating an example method for encoding a current block.

FIG. 5 is a flowchart illustrating an example method for encoding a current block. The current block may comprise a current CU. Although described with respect to video encoder 200 (FIGS. 1 and 2), it should be understood that other devices may be configured to perform a method similar to that of FIG. 5.

Figure 13:
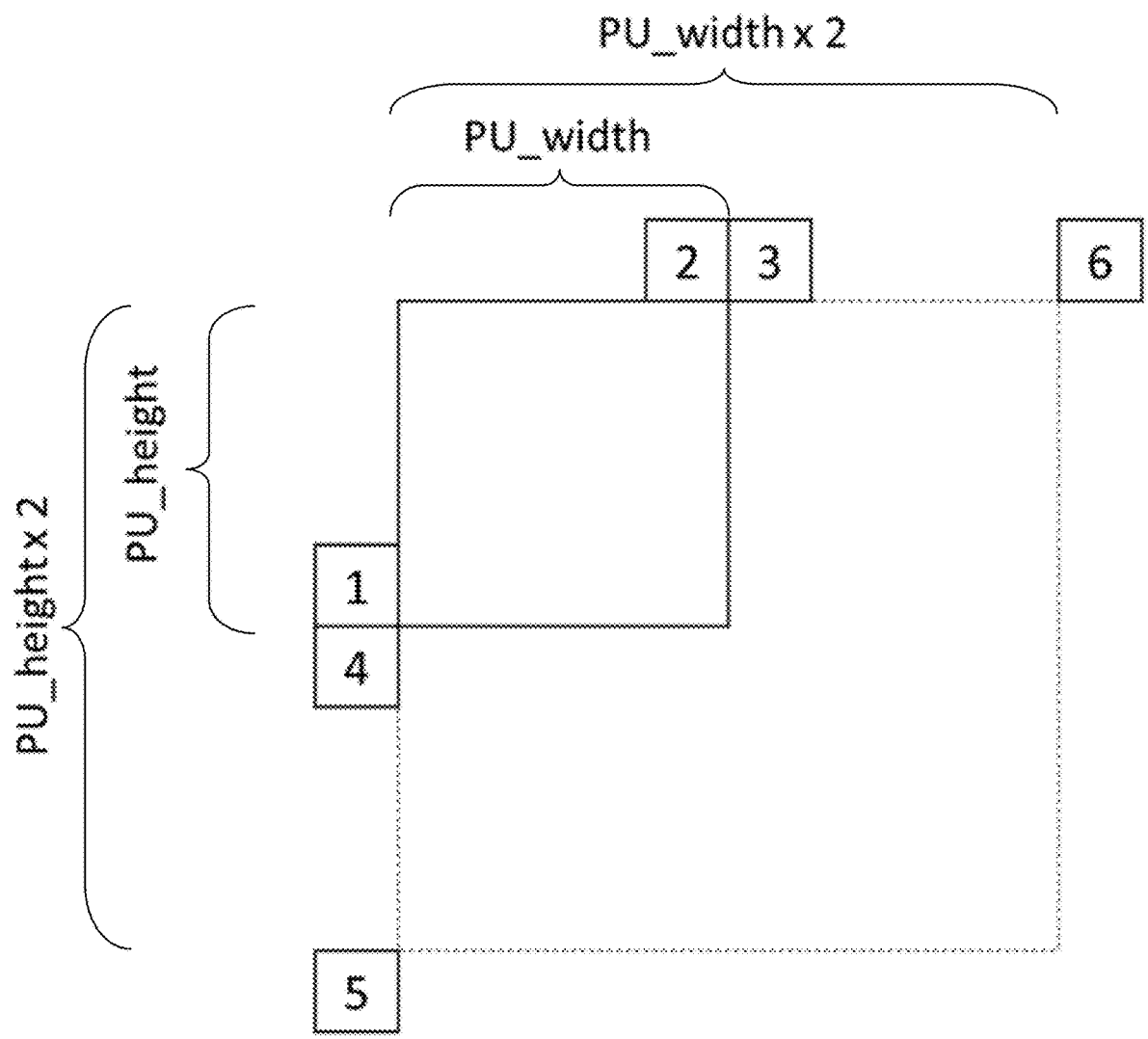
FIG. 13 is a conceptual diagram illustrating an example of a non-sub-PU spatial-temporal motion vector predictor.

In this example, video encoder 200 initially predicts the current block (350). For example, video encoder 200 may form a prediction block for the current block. Video encoder 200 (e.g., motion estimation unit 222) may perform the techniques for generating the STMVP as part of predicting the current block. For example, video encoder 200 (e.g., motion estimation unit 222) may generate the STMVP as shown in FIG. 13 and described later in this disclosure. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Figure 6:
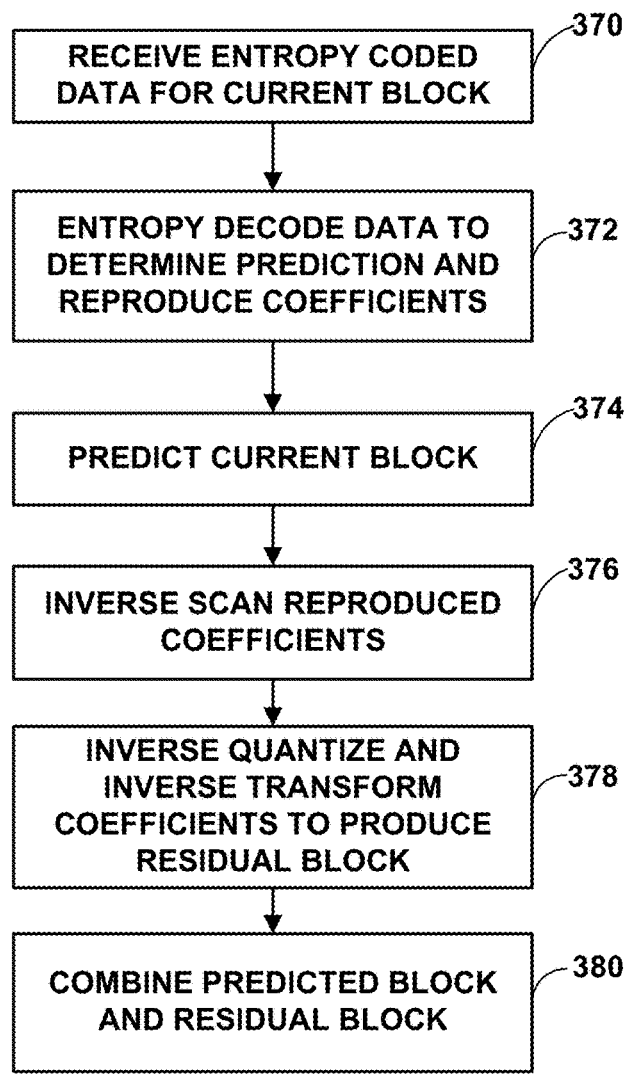
FIG. 6 is a flowchart illustrating an example method for decoding a current block of video data.

FIG. 6 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 6.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 (e.g., motion compensation unit 316) may perform the techniques for generating the STMVP as part of predicting the current block. For example, video decoder 300 (e.g., motion compensation unit 316) may generate the STMVP as shown in FIG. 13 and described later in this disclosure. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

The ITU-T Video Coding Experts Group (VCEG) (Q6/16) and ISO/IEC Motion Picture Experts Group) (MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). These groups are working together on this exploration activity in a joint collaboration effort known as the Joint Video Experts Team (JVET) to evaluate compression technology designs proposed by their experts in this area. The JVET first met during 19-21 Oct. 2015. J. Chen et al, "Algorithm Description of Joint Exploration Test Model 7", Joint Video Experts Team (JVET) of ITU-T SG 16 WP 3 and ISO/IEC JTC 1/SC 29/WG 11, $7^{th}$ Meeting, Torino, IT, 13-21 Jul. 2017, document JVET-G1001 is an algorithm description of Joint Exploration Test Model 7 (JEM-7). The JVET is currently developing the Versatile Video Coding (VVC) standard based on the JEM. Bross et al., "Versatile Video Coding (Draft 2)," Joint Video Experts Team (JVET) of ITU-T SG 16 WP 3 and ISO/IEC JTC 1/SC 29/WG 11, $11^{th}$ Meeting, Ljubljana, SI, 10-18 Jul. 2018, document JVET-K1001 (hereinafter, "JVET-K1001") is a draft of the VVC standard.

In HEVC, the largest coding unit in a slice is called a coding tree block (CTB) or a coding tree unit (CTU). A CTB contains a quad-tree, the nodes of which are coding units. The size of a CTB can range from 16×16 to 64×64 in the HEVC main profile (although technically 8×8 CTB sizes can be supported). A CU may be the same size as a CTB, although a CU can be as small as 8×8. Furthermore, each CU is coded with one mode (i.e., either inter-coded or intra-coded). When a CU is inter-coded, the CU may be further partitioned into 2 or 4 PUs or become just one PU when further partitioning does not apply. When two PUs are present in one CU, the two PUs can be half-size rectangles or two rectangles with sizes equal to ¼ or ¾ the size of the CU. When the CU is inter-coded, one set of motion information is present for each PU. In addition, each PU is coded with a unique inter-prediction mode to derive the set of motion information.

In HEVC, there are two inter-prediction modes, named merge mode and advanced motion vector prediction (AMVP) mode, respectively for a PU. In HEVC, skip mode is considered as a special case of merge mode. In either AMVP or merge mode, a motion vector (MV) candidate list is maintained for multiple motion vector predictors. The motion vector(s), as well as reference indices in the merge mode, of a PU are generated by taking one candidate from the MV candidate list. In HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and reference indices. If a merge candidate is identified by a merge index, the reference pictures are used for the prediction of the current blocks, as well as the associated motion vectors. However, under AMVP mode, for each potential prediction direction from either list 0 or list 1, a reference index is explicitly signaled, together with an MV predictor (MVP) index to the MV candidate list since the AMVP candidate contains only a motion vector. A reference index is a value that specifies a reference picture in a reference picture list. In AMVP mode, the predicted motion vectors can be further refined. As can be seen above, a merge candidate corresponds to a full set of motion information while an AMVP candidate contains just one motion vector for a specific prediction direction. The candidates for both modes are derived similarly from the same spatial and temporal neighboring blocks.

Figure 7A:
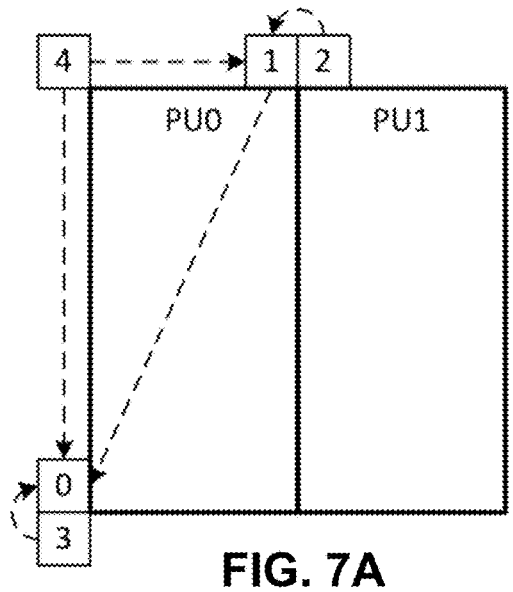
FIG. 7A is a conceptual diagram illustrating example spatial neighboring motion vector candidates for merge mode.
Figure 7B:
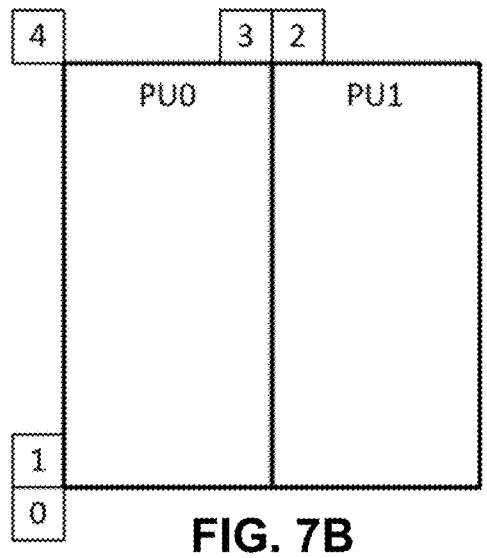
FIG. 7B is a conceptual diagram illustrating example spatial neighboring motion vector candidates for advanced motion vector prediction (AMVP) mode.

Spatial MV candidates are derived from the neighboring blocks shown in FIG. 7A and FIG. 7B, for a specific PU ($PU_0$), although the methods for generating the spatial MV candidates from the blocks differ for merge and AMVP modes. Specifically, FIG. 7A is a conceptual diagram illustrating example spatial neighboring motion vector candidates for merge mode. FIG. 7B is a conceptual diagram illustrating example spatial neighboring motion vector candidates for AMVP mode.

In merge mode, up to four spatial MV candidates can be derived with the order shown in FIG. 7A. Specifically, the order is as follows: left (0), above (1), above right (2), below left (3), and above left (4). Thus, in the merge mode, the MV candidate list may include, in the following order: a merge candidate derived from a block covering the left location (0), a merge candidate derived from a block covering the right location (1), a merge candidate derived from a block covering the above-right location (2), a merge candidate derived from a block covering the below-left location (3), a merge candidate derived from a block covering the above left location (4).

In AMVP mode, the neighboring blocks are divided into two groups. The first group is a left group consisting of blocks covering locations 0 and 1. The second group is an above group consisting of blocks covering 2, 3, and 4, as shown in FIG. 7B. For each group, a potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 8B:
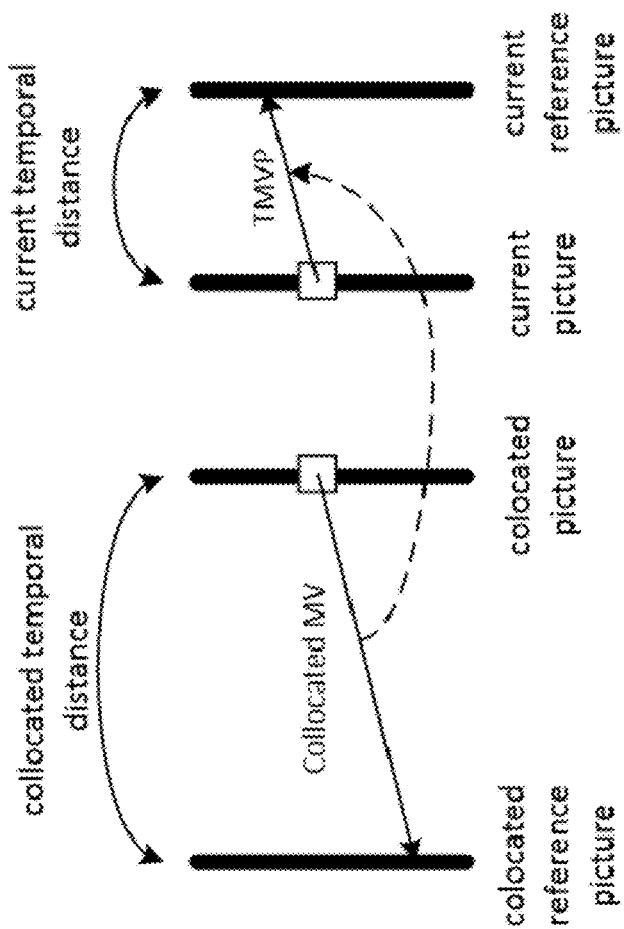
FIG. 8B is a conceptual diagram illustrating an example of motion vector scaling.
Figure 8A:
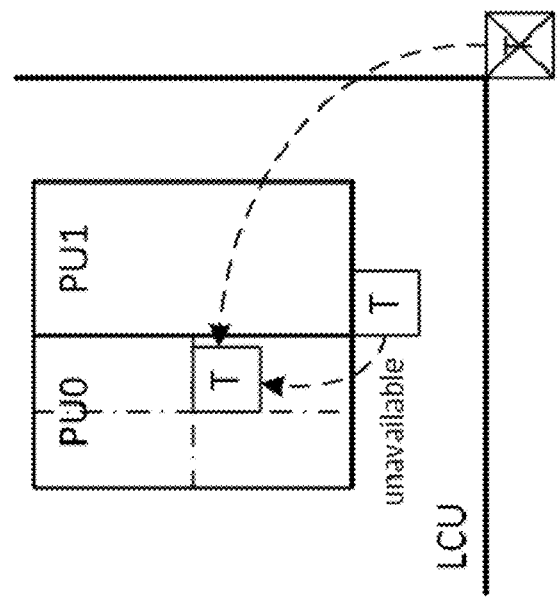
FIG. 8A is a conceptual diagram illustrating an example temporal motion vector prediction candidate.

FIGS. 8A and 8B are conceptual diagrams illustrating temporal motion vector prediction candidates. FIG. 8A shows an example of a TMVP candidate. A TMVP candidate, if enabled and available, is added into the MV candidate list after spatial motion vector candidates. The process of motion vector derivation for a TMVP candidate is the same for both merge and AMVP modes, however the target reference index for the TMVP candidate in the merge mode is always set to 0 while the reference picture index for the TMVP candidate in the AMVP mode is indicated by a signaled reference index.

The primary block location for TMVP candidate derivation is the bottom right block outside of the collocated PU as shown in FIG. 8A as a block "T", to compensate for the bias to the above and left blocks used to generate spatial neighboring candidates. However, if that block is located outside of the current CTB row or motion information is not available, the block is substituted with a center block of the PU.

A motion vector for the TMVP candidate is derived from the co-located PU of the co-located picture, indicated in the slice level. The motion vector for the co-located PU is called a co-located MV.

FIG. 8B shows an example of MV scaling. To derive the TMVP candidate, the co-located MV may need to be scaled to compensate the temporal distance differences, as shown in FIG. 8B.

Figure 9:
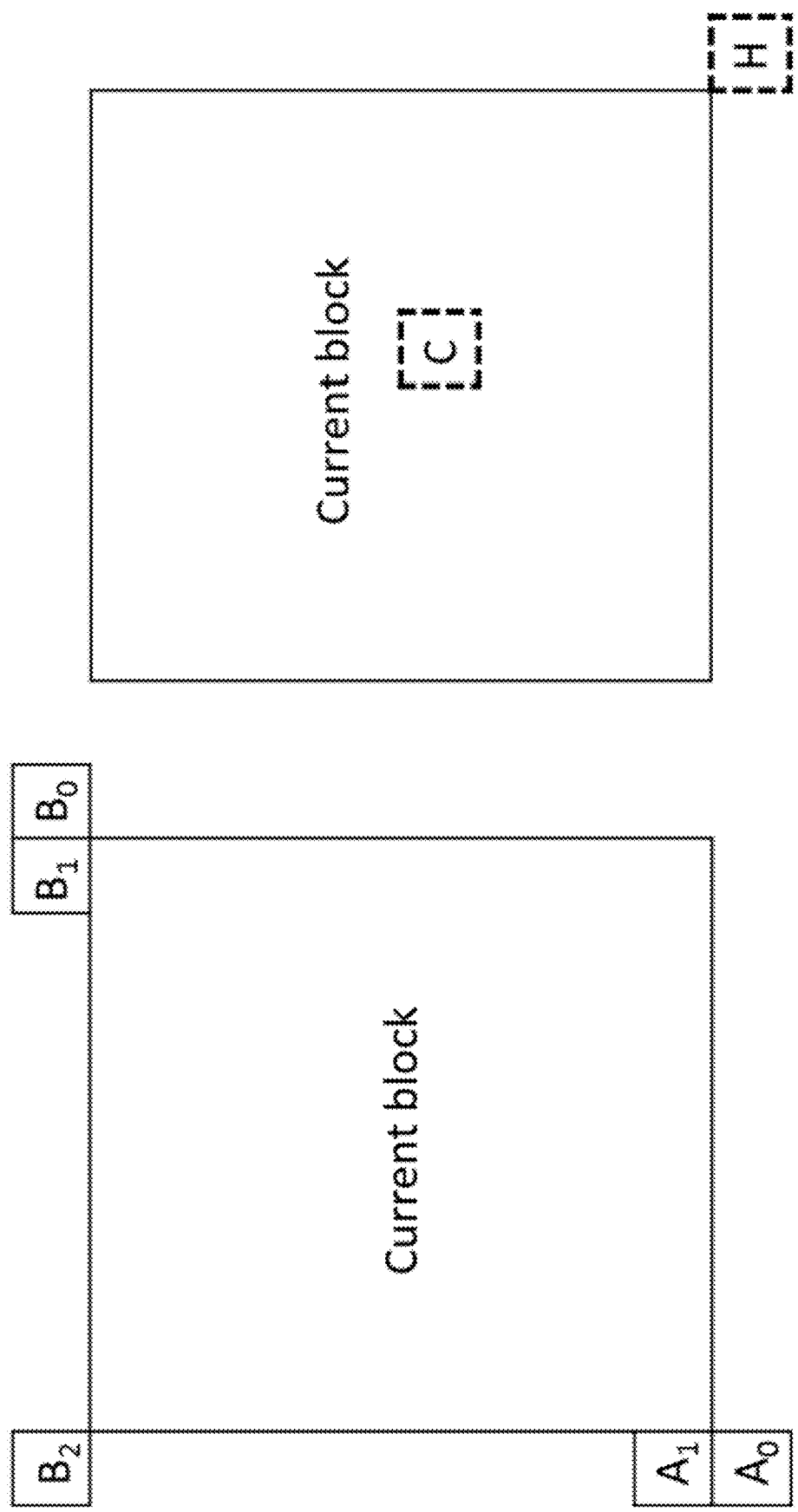
FIG. 9 is a conceptual diagram illustrating spatial and temporal neighboring motion vector candidates for merge and skip modes.

For the skip mode and merge mode, video encoder 200 signals a merge index to indicate which candidate in the merging candidate list is used. In skip mode and merge mode, video encoder 200 does not transmit an inter prediction indicator, reference index, or MVD. Video encoder 200 and video decoder 300 consider two types of merging candidates in merge mode: spatial motion vector predictor (SMVP) and TMVP. For SMVP derivation, a maximum of four merge candidates are selected among candidates that are located in positions as depicted in FIG. 9. The order of derivation is $A_1 \rightarrow B_1 \rightarrow B_0 \rightarrow A_0 \rightarrow (B_2)$. Position $B_2$ is considered only when any PU of position $A_1$, $B_1$, $B_0$, $A_0$ is not available or is intra coded or the total number of candidates, after pruning, from positions $A_1$, $B_1$, $B_0$, $A_0$ is less than four.

In the derivation of the TMVP, video encoder 200 (e.g., motion estimation unit 222) and video decoder 300 (e.g., motion compensation unit 316) derive a scaled motion vector based on a co-located PU belonging to one of the reference pictures of current picture within the signaled reference picture list. Video encoder 200 explicitly signals the reference picture list to be used for derivation of the co-located PU in the slice header. Video encoder 200 and video decoder 300 obtain the scaled motion vector for the temporal merge candidate with the scaled motion vector of the co-located PU using the picture order count (POC) distances, tb and td, where tb is defined to be the POC difference between the reference picture of the current picture and the current picture and td is defined to be the POC difference between the reference picture of the co-located picture and the co-located picture. The reference picture index of the temporal merge candidate is set to zero. A practical realization of the scaling process is described in the HEVC draft specification. For a B-slice, two motion vectors are obtained and combined to make the bi-predictive merge candidate, one for reference picture list 0 and the other for reference picture list 1.

Video encoder 200 (e.g., motion estimation unit 222) and video decoder 300 (e.g., motion compensation unit 316) select the co-located PU between two candidate positions, C and H, as depicted in FIG. 9. If a PU at position H is not available, or is intra coded, or is outside of the current CTU row, position C is used. Otherwise, position H is used for the derivation of the temporal merge candidate.

Besides SMVPs and TMVPs, there are two additional types of synthetic merge candidates: combined bi-predictive MVP and zero MVP. Video encoder 200 (e.g., motion estimation unit 222) and video decoder 300 (e.g., motion compensation unit 316) generate the combined bi-predictive MVP by utilizing the SMVP and the TMVP. A combined bi-predictive merge candidate is used for a B-Slice only. For example, two candidates in the original merge candidate list, which have mvL0 and refIdxL0 or mvL1 and refIdxL1, are used to create a combined bi-predictive merge candidate.

In the process of candidate selection, video encoder 200 (e.g., motion estimation unit 222) and video decoder 300 (e.g., motion compensation unit 316) remove candidates having the same motion parameters as the previous candidate in the processing order from the candidate list. This process is defined as a pruning process. Also, candidates inside the same merge estimation region (MER) are not considered, in order to help parallel merge processing. Redundant partition shape is avoided in order to not emulate a virtual 2N×2N partition.

Between each generation step, the derivation process is stopped if the number of candidates reaches to MaxNumMergeCand. In the current common test condition, MaxNumMergeCand is set equal to five. Since the number of candidates is constant, an index of best merge candidate is encoded using truncated unary binarization.

Several other aspects of merge and AMVP modes are worth mentioning as follows. For example, video encoder 200 and video decoder 300 may perform motion vector scaling. It is assumed that the value of motion vectors is proportional to the distance of pictures in the presentation time. A motion vector associates two pictures, the reference picture, and the picture containing the motion vector (namely, the containing picture). When a motion vector is utilized to predict the other motion vector, the distance of the containing picture and the reference picture is calculated based on the POC values.

For a motion vector to be predicted, both its associated containing picture and reference picture may be different. Therefore, a new distance (based on POC) is calculated. Video encoder 200 (e.g., motion estimation unit 222) and video decoder 300 (e.g., motion compensation unit 316) may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In another example, video encoder 200 (e.g., motion estimation unit 222) and video decoder 300 (e.g., motion compensation unit 316) may perform artificial motion vector candidate generation. If a motion vector candidate list is not complete, artificial motion vector candidates may be generated and inserted at the end of the list until the list has a complete set of candidates. The artificial motion vector candidates are artificial in the sense that they do not express the motion vectors of any available spatial or temporal neighboring block.

In merge mode, there are two types of artificial MV candidates: (1) combined candidates and (2) zero-candidates. A video coder includes one or more zero-candidates in an MV candidate list if the first type does not provide enough artificial candidates to fill the MV candidate list. A zero-candidate is a candidate that specifies motion vectors with 0 magnitude. Combined candidates are derived only for B-slices. For each pair of candidates that are already in the candidate list and have necessary motion information, a video coder may derive a bi-directional combined motion vector candidate as a combination of the motion vector of a first candidate of the pair, where the motion vector of the first candidate refers to a picture in the list 0, and the motion vector of a second candidate of the pair, where the motion vector of the second candidate refers to a picture in the list 1.

In another example, a video coder (e.g., video encoder 200 or video decoder 300) may perform a pruning process for candidate insertion. Candidates from different blocks may happen to be the same, which decreases the efficiency of a merge/AMVP candidate list. A pruning process may be applied to solve this problem. The pruning process compares one candidate against the others in the current candidate list to avoid inserting identical candidates to a certain extent. To reduce complexity, the pruning process is applied to a limited number of candidates instead of comparing each potential candidate with all the other candidates.

Advanced temporal motion vector prediction was proposed to allow each PU to obtain multiple sets of motion information (including motion vectors and reference pictures). The motion information in an advanced temporal motion vector predictor (ATMVP) comes only from the reference pictures. To derive an ATMVP of a current PU, the first step is determining where the temporal motion vectors are to be fetched from. This step of the advanced temporal motion vector prediction process finds the first available motion vector in five neighboring blocks in the order or Left, Above, Above-right, Left-bottom, and Above-left. The definition of the five neighboring blocks is the same as the spatial merge candidates of the current PU. For instance, as shown in FIG. 9, the five neighboring blocks are A0, A1, B0, B1 and B2. To avoid the repetitive scanning process of neighboring blocks, video encoder 200 and video decoder 300 may only find the motion vector of the first merge candidate in the already-derived merge candidate list to determine where to fetch the temporal motion vector. The PUs are split into square N×N sub-PUs (e.g., N is set to 4). The motion vectors of the sub-PUs are derived recursively, following raster scan order.

Figure 10:
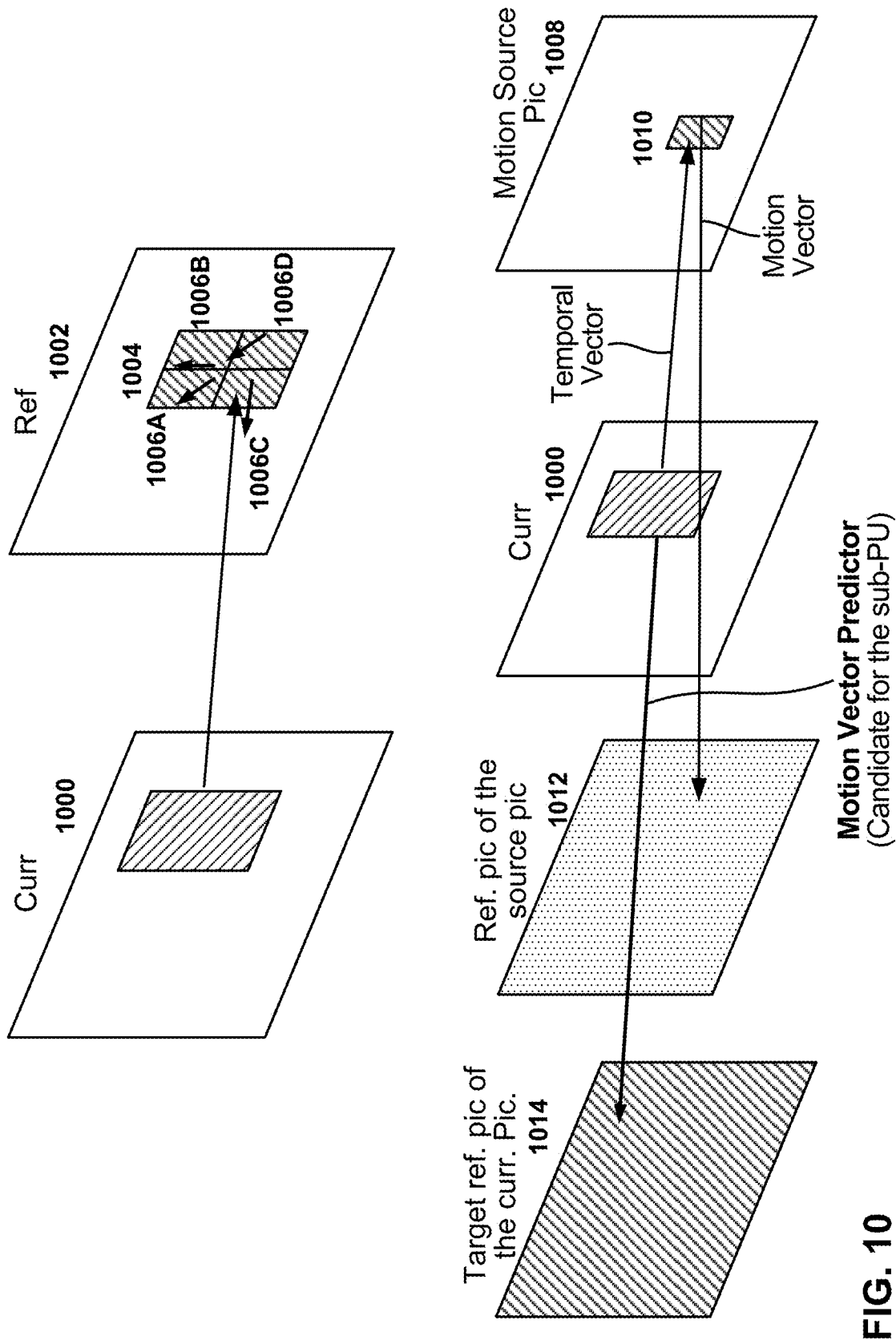
FIG. 10 is a conceptual diagram illustrating an example of sub-prediction unit (PU) motion prediction from a reference picture.

FIG. 10 is a conceptual diagram illustrating sub-PU motion prediction from a reference picture. In FIG. 10, a temporal vector of a current picture 1000 is shown pointing towards a reference picture 1002. In FIG. 10, current picture 1000 is denoted as "Curr" and reference picture 1002 is denoted as "Ref." A PU 1004 in reference picture 1002 is shown as divided into four sub-PUs 1006A, 1006B, 1006C, 1006D, each with its own motion vector. This disclosure may refer to sub-PUs 1006A, 1006B, 1006C, and 1006D collectively as "sub-PUs 1006."

Furthermore, as shown in the example of FIG. 10, video encoder 200 and video decoder 300 may utilize motion vectors of sub-PUs 1006 to generate an ATMVP. For instance, in the example of FIG. 10, a motion source picture 1008 includes a sub-PU 1010. Motion source picture 1008 may be the same picture as reference picture 1002 and sub-PU 1010 may be one of sub-PUs 1006. In the example of FIG. 10, motion source picture 1008 is denoted as "motion source pic." If a motion vector for sub-PU 1010 points to a reference picture 1012 that is 30 pictures away from motion source picture 1008, the ATMVP may point to a reference picture 1014 that is 30 pictures away from current picture 1000. In the example of FIG. 10, reference picture 1012 is denoted as the "Ref pic of the source pic." In the example of FIG. 11, reference picture 1014 is denoted as the "Target ref pic. of the curr. pic."

A spatial-temporal motion vector predictor (STMVP) considers not only the temporal motion vector predictors but also the spatial motion vector predictors. By averaging motion information of two spatial motion vector predictors and one temporal motion vector predictor, a video coder may generate an additional merge candidate (i.e., an STMVP) for each sub-PU to achieve further Bj ontegaard-Delta (BD) rate reduction.

To derive the STMVP, a video coder may use two spatial neighbors and one temporal motion predictor to derive the motion vectors in each sub-PU. A process to derive the STMVP is described with respect to FIG. 11A. FIG. 11A is a conceptual diagram illustrating an example of one PU with four sub-blocks and its neighboring blocks. In the process to derive the STMVP, PUs are split into square N×N sub-PUs (e.g., where N is set to 4). The video coder may derive the motion vectors of the sub-PUs recursively, in a raster scan order. Thus, the STMVP for a block may include a set of motion information (e.g., motion vectors and reference indices) for each of the sub-PUs of the block. In the example of FIG. 11A, an 8×8 PU 1100 contains four 4×4 sub-PUs 1102A, 1102B, 1102C, and 1102D (collectively, "sub-PUs 1102"). In the example of FIG. 11A, sub-PUs 1102 are labeled A, B, C, and D. Neighboring N×N blocks 1104A, 1104B, 1104C, and 1104D (collectively, "neighboring blocks 1104") in the current frame are labeled as a, b, c, and d in FIG. 11A.

To derive the motion vector of sub-PU A, the video coder uses two spatial neighbors 1104B and 1104C (b and c) and one temporal motion vector predictor for 1102D (D). Thus, if the video coder is generating a uni-prediction STMVP using sub-PUs (i.e., a uni-prediction sub-PU STMVP), the video coder may (1) set an x-component of a list X motion vector of sub-PU 1102A (A) to an average of the x-components of the list X motion vectors of spatial neighbors 1104B and 1104C (b and c) and the temporal motion predictor for 1102D (D), and (2) set a y-component of the list X motion vector of sub-PU 1102A (A) to an average of the y-components of the list X motion vectors of spatial neighbors 1104B and 1104C (b and c) and the temporal motion predictor for 1104D (D), where X is 0 or 1. If the video coder is generating a bi-prediction sub-PU STMVP, the video coder may determine the x- and y-components of the list X motion vector of sub-PU 1102A (A) in the same way as above, and may determine the x- and y-components of the list Y motion vector of sub-PU 1102A (A) in the same manner, substituting X for Y.

In some examples, the video coder uses two spatial neighbors and one temporal motion vector predictor to generate the STMVP for each of the sub-PUs. For example, the video coder may use an above and left neighbor of the current sub-PU and a temporal motion vector predictor. For sub-PU 1102B, the video coder may use 1104B and 1104D (b and d) and temporal motion vector predictor for 1102D (D). For sub-PU 1102C, the video coder may use 1104A and 1104C (a and c) and temporal motion vector predictor for 1102D (D). For sub-PU 1102D, the video coder may use 1104A and 1104D (a and d) and temporal motion vector predictor for 1102D (D).

In other examples, the video coder may use the above and left neighbor and a temporal motion vector predictor. For example, for sub-PU 1102B, the video coder may use 1104D and 1102A (d and A) and temporal motion vector predictor for 1102D (D). For sub-PU 1102C, the video coder may use 1104A and 1102A (a and A) and temporal motion vector predictor for 1102D (D). For sub-PU 1102D, the video coder may use 1102B and 1102C and temporal motion vector predictor for 1102D.

FIG. 11B shows another process to derive the STMVP. In the example of FIG. 11B, an 8×8 PU 1110 contains four 4×4 sub-PUs 1112A, 1112B, 1112C, and 1112D (collectively, "sub-PUs 1112"). Sub-PUs 1112 are labeled A, B, C, and D. Neighboring N×N blocks 1114A, 1114B, 1114C, and 1114D (collectively, "neighboring blocks 1114") in the current frame are labeled as a, b, c, and d in FIG. 11B.

In the example of FIG. 11B, a video coder uses two spatial neighbors 1114B and 1114C (b and c) and two temporal motion predictors 1112B and 1112C (B and C) to derive the motion of sub-PU 1112A (A) instead of one temporal motion predictor.

Figure 12:
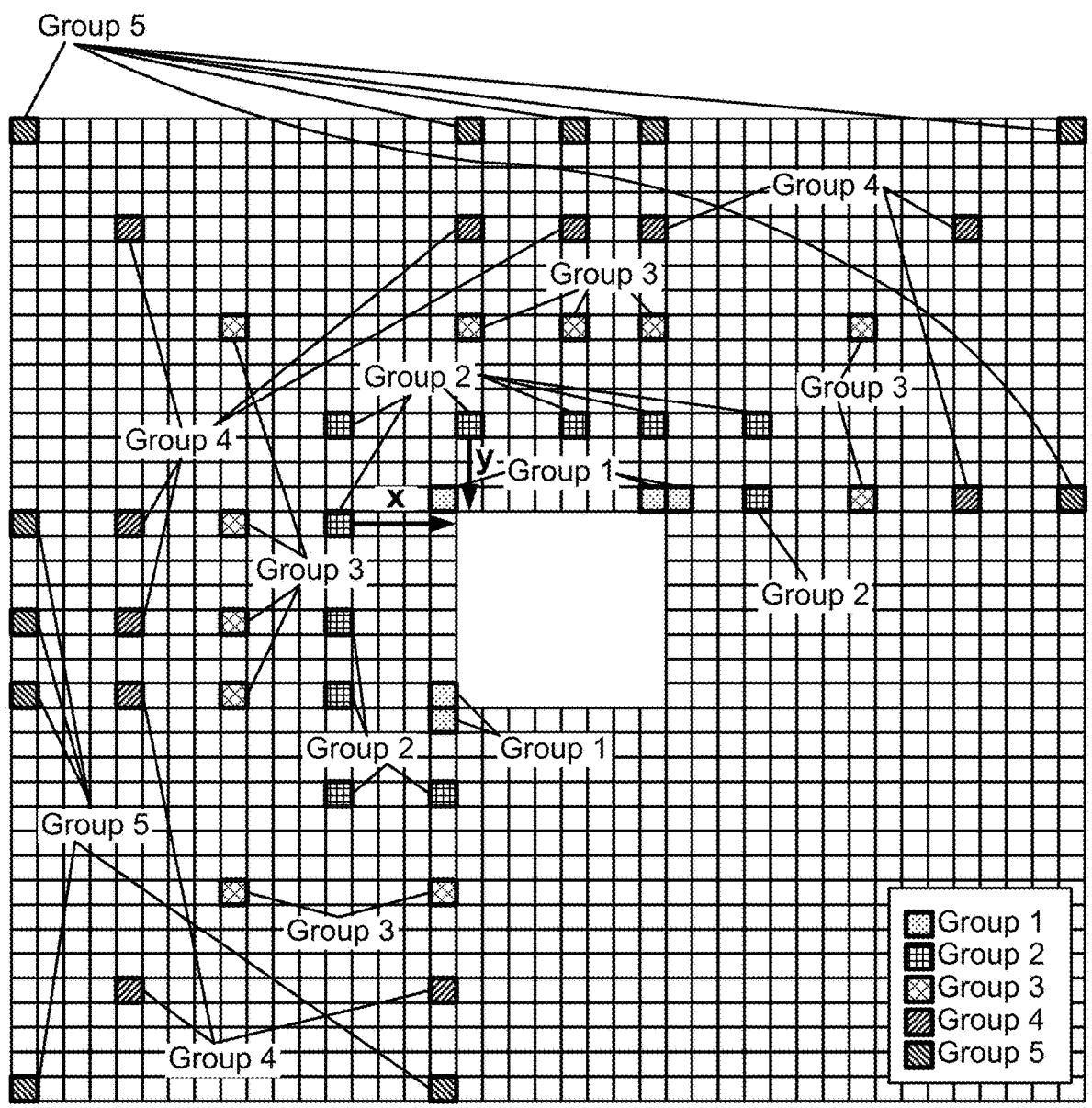
FIG. 12 is a conceptual diagram illustrating example spatial neighboring blocks used to derive spatial merge candidates.

A non-adjacent spatial merge candidate prediction technique may be utilized for future video coding standards such as VVC. By using non-adjacent spatial merge candidates, the merge candidate list can be increased in size and filled with non-adjacent spatial neighboring blocks. FIG. 12 is a conceptual diagram illustrating example spatial neighboring blocks used to derive the spatial merge candidates. FIG. 12 depicts five groups of spatial neighboring blocks, labeled Groups 1-5. Group 1 is the group of adjacent spatial neighboring blocks and represent the blocks A0, A1, B0, B1 and B2 as shown in FIG. 9. Groups 2-5 are non-adjacent spatial neighboring blocks. Video encoder 200 and video decoder 300 may use non-adjacent spatial neighboring blocks as merge candidates from Group 2, Group 3, Group 4 and/or Group 5.

Non-sub-PU STMVP prediction mode may be used for the future video coding standards such as VVC. FIG. 13 is a conceptual diagram illustrating an example of a non-sub-PU spatial-temporal motion vector predictor. In the example of FIG. 13, at most 2 above positions and 2 left positions are checked (position_2 (PU width-1, -1), position_6 (PU width×2, -1)), shown as position 2 and 6, and (position_1 (-1, PU_height-1), 5 (-1, PU_height×2)), shown as position 1 and 5. The non-sub-PU STMVP is generated by averaging 3 candidates, which include 2 spatial candidates and 1 temporal candidates. If only two candidates are available, the STMVP is generated by averaging the two candidates. If only one candidate is available, then the STMVP is just that one motion vector.

For example, to generate a uni-prediction non-sub-PU STMVP by averaging two or more candidates, a video encoder (e.g., video encoder 200 or video decoder 300) may set an x-component of a list A motion vector of the uni-prediction non-sub-PU STMVP to an average of the x components of the list A motion vectors of the candidates, where A is 0 or 1. Additionally, the video coder may set a y-component of the list A motion vector of the uni-prediction non-sub-PU STMVP to an average of they components of the list A motion vectors of the candidates. To generate a bi-prediction non-sub-PU STMVP by averaging two or more candidates, the video coder may (1) set an x-component of a list A motion vector of the bi-prediction non-sub-PU STMVP to an average of the x components of the list A motion vectors of the candidates, where A is 0 or 1; (2) set a y-component of the list A motion vector of the bi-prediction non-sub-PU STMVP to an average of they components of the list A motion vectors of the candidates; (3) set an x-component of a list B motion vector of the bi-prediction non-sub-PU STMVP to an average of the x components of the list B motion vectors of the candidates, where B is 1-A; and (4) set a y-component of the list B motion vector of the bi-prediction non-sub-PU STMVP to an average of they components of the list B motion vectors of the candidates.

History-based Motion Vector Prediction (HMVP) prediction mode may be used for future video coding standards, such as VVC. With HMVP, a video coder generates a table with multiple HMVP candidates during encoding and decoding processes. The video coder populates the table with motion vectors used by a previous block(s). The video coder applies a First-In-First-Out (FIFO) rule to update the table, and the video coder also uses a redundancy check when inserting a new HMVP candidate to the table. The video coder may update the table when encoding/decoding an inter-predicted CU. The video coder may use the HMVP table in merge mode and/or AMVP mode. In merge mode, the video coder may add the motion vector predictors in the HMVP table to the merge candidate list.

The examples of this disclosure provided in this disclosure may be used in combination or separately. The examples may be performed by either or both video encoder 200 and video decoder 300.

In many video standards and video encoder and decoder implementations, generation of the STMVP requires motion vector scaling operations. As noted above, a video coder may generate an STMVP for a block of a current picture by averaging motion vectors of three motion vector predictors: two spatial motion vector predictors and one temporal motion vector predictor. Typically, the motion information of the three motion vector predictors indicate locations in reference pictures that correspond to the same object. For example, the motion information of the three motion vector predictors may indicate locations in reference pictures that correspond to a headlight of a car that is moving from left to right in a video scene. If a first one of the three motion vector predictors has motion information that indicates a location in a first reference picture earlier than a second reference picture indicated by motion information of the second and third motion vector predictors, a motion vector of the motion information of the first motion vector predictor may be too long or too short if used to indicate a location in the second reference picture. For instance, in the example involving the headlight of the car, the motion vector of the first motion vector predictor may indicate a location that is left of the location of the headlight in the second reference picture. Thus, to use the first motion vector predictor in an STMVP, a video coder may scale the motion vector of the first motion vector predictor based on a distance between a POC value of the first reference picture and a POC value of the current picture and a distance between a POC value of the second reference picture and the POC value of the current picture. For instance, if the distance between the POC value of the first reference picture and the POC value of the current picture is twice the distance between the POC value of the second reference picture and the POC value of the current picture, the video coder may decrease the magnitude of the motion vector of the first motion vector predictor by ½.

However, motion vector scaling slows down encoding and decoding processes and complicates the encoder and decoder design. For example, scaling a motion vector needed for generating an STMVP may delay the process of generating an MV candidate list. The techniques of this disclosure remove the motion vector scaling of the STMVP from video encoder 200 and video decoder 300 by generating the STMVP in certain fashions that avoid motion vector scaling. These techniques may speed up encoding and decoding, may simplify video encoder 200 and video decoder 300, and may permit parallel processing in many instances.

In accordance with techniques of this disclosure, video encoder 200 and video decoder 300 may generate the STMVP from candidates that have the same reference pictures. Motion estimation unit 222 of video encoder 200, e.g., may generate the STMVP and motion compensation unit 316 may generate the STMVP as discussed hereinafter. The techniques of this disclosure can be used in generating sub-PU STMVPs and non-sub-PU STMVPs. The techniques of this disclosure can be used in the field of deriving motion vectors from two or more candidates. Furthermore, this disclosure proposes that the STMVP can be derived from the candidates that have the same reference pictures.

Figure 14:
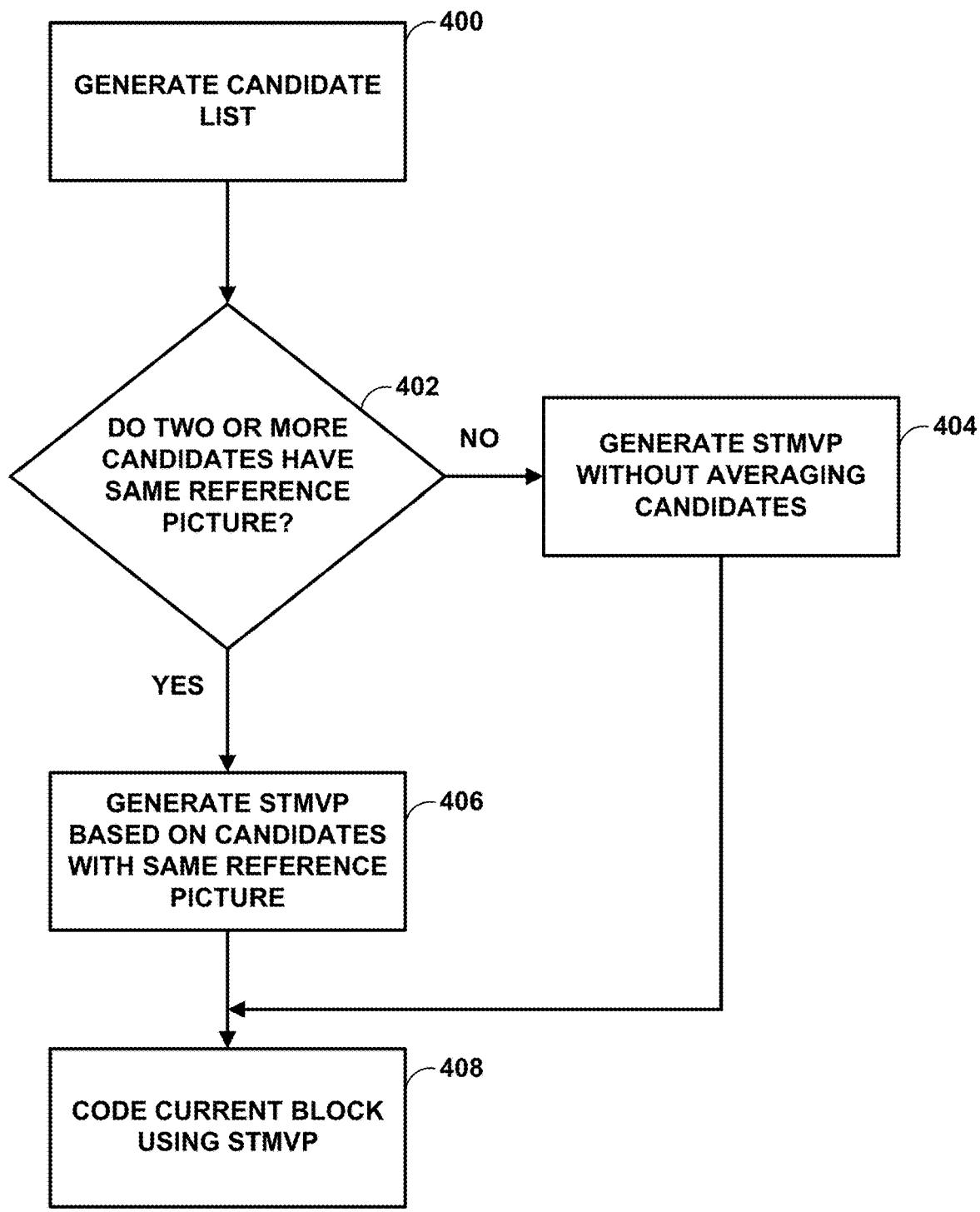
FIG. 14 is a flowchart illustrating coding techniques according to the present disclosure.

FIG. 14 is a flowchart of a method of coding according to techniques of the present disclosure. Video encoder 200 (e.g., motion estimation unit 222 of video encoder 200) and video decoder 300 (e.g., motion compensation unit 316 of video decoder 300) may generate a candidate list for motion vector prediction (400) as discussed above with reference to FIGS. 9-13. For example, video encoder 200 and video decoder 300 may generate a candidate list including a candidate derived from a first neighboring block and a candidate derived from a second neighboring block wherein the first neighboring block is a first-available neighboring block from a set of neighboring blocks in predefined positions and the second neighboring block is a first-available neighboring block among another set of neighboring blocks in predefined positions as discussed above. Video encoder 200 (e.g., motion estimation unit 222 of video encoder 200) and video decoder 300 (e.g., motion compensation unit 316 of video decoder 300) may then determine whether two or more candidates in the candidate list have the same reference picture as each other (402), i.e., the motion vectors of the candidates point to the same reference picture. In other words, for any first and second candidate in the candidate list, the first candidate may be considered to have the same reference picture as the second reference picture if: (1) the first and second candidates are uni-directional candidates and the first and second candidates have the same list 0 reference pictures, (2) the first and second candidates are uni-directional candidates and the first and second candidates have the same list 1 reference pictures, (3) the first candidate is a bi-directional candidate and a list 0 reference picture is the same as a list 0 motion vector of the second candidate, or (4) the first candidate is a bi-directional candidate and a list 1 reference picture of the first candidate is the same as a list 1 reference picture of the second candidate. A list X reference picture is a reference picture in list X and a list X motion vector is a motion vector that indicates a location in a list X reference picture, where X is 0 or 1.

In the example of FIG. 14, if none of the candidates in the candidate list has the same reference picture as any other one of the candidates ("NO" branch of 402), video encoder 200 (e.g., motion estimation unit 222 of video encoder 200) and video decoder 300 (e.g., motion compensation unit 316 of video decoder 300) may generate an STMVP without averaging any of the candidates (404). For example, the video coder may use a motion vector of the TMVP as the STMVP. In another example, the video coder may use a motion vector of a spatial motion vector predictor as the STMVP.

Figure 15:
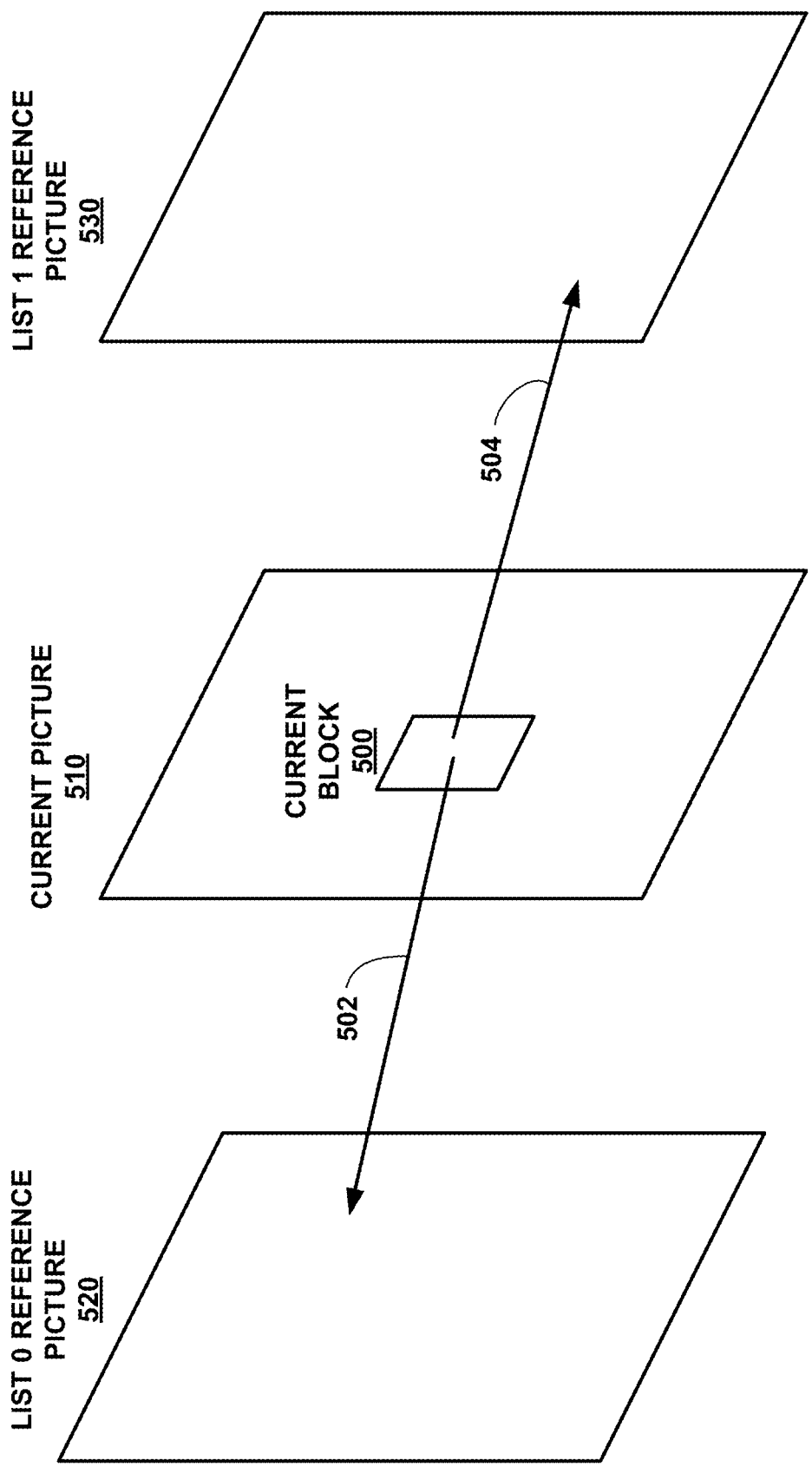
FIG. 15 is a conceptual diagram illustrating bi-prediction according to techniques of the present disclosure.

In some cases, video encoder 200 and video decoder 300 may use bi-prediction to generate a prediction block for a current block of the video data. FIG. 15 is a conceptual drawing illustrating bi-prediction techniques according to the present disclosure. With bi-prediction, video encoder 200 and video decoder 300 use motion vectors in two directions: toward a location in a reference picture in list 0 and toward a location in a reference picture in list 1. In FIG. 15, a current block 500 within a current picture 510 is shown. When using bi-prediction, current block 500 has a list 0 motion vector 502 and a list 1 motion vector 504. Video encoder 200 and video decoder 300 determine a first preliminary prediction block corresponding to a location that is identified by list 0 motion vector 502 within a list 0 reference picture 520. List 0 reference picture 520 is a reference picture in reference picture list 0. Additionally, video encoder 200 and video decoder 300 determine a second preliminary prediction block corresponding to a location that is identified by list 1 motion vector 504 within a list 1 reference picture 530. List 1 reference picture 530 is a picture in reference picture list 1. Video encoder 200 and video decoder 300 may generate a prediction block for current block 500 based on the first preliminary prediction block and the second preliminary prediction block. For example, each sample in the prediction block for current block 500 may be equal to an average of corresponding samples in the first and second preliminary prediction blocks.

Referring back to FIG. 14, if bi-prediction is used (i.e., if the video coder is generating a bi-predictive STMVP) and none of the candidates have the same reference picture in either direction ("NO" branch of 402), video encoder 200 (e.g., motion estimation unit 222 of video encoder 200) and video decoder 300 (e.g., motion compensation unit 316 of video decoder 300) may generate the STMVP in the list 0 direction based on one of the candidates' motion vector in the L0 direction and may generate the STMVP in the L1 direction based on the same candidate's or a different candidate's motion vector in the L1 direction (404). In other words, the video coder may generate the bi-predictive STMVP such that a list 0 motion vector of the bi-predictive STMVP specifies a list 0 motion vector of one of the candidates and such that a list 1 motion vector of the bi-predictive STMVP specifies a list 1 motion vector of the same candidate or a different candidate.

In other examples, if no candidates have the same reference picture, video encoder 200 (e.g., motion estimation unit 222 of video encoder 200) and video decoder 300 (e.g., motion compensation unit 316 of video decoder 300) do not generate STMVPs.

If two or more of the candidates do have the same reference pictures as each other ("YES" branch of 406), video encoder 200 (e.g., motion estimation unit 222 of video encoder 200) and video decoder 300 (e.g., motion compensation unit 316 of video decoder 300) may select two or more candidates that have the same reference picture as each other and generate the STMVP based on the motion vectors of the selected candidates (406). For example, video encoder 200 (e.g., motion estimation unit 222 of video encoder 200) and video decoder 300 (e.g., motion compensation unit 316 of video decoder 300) may generate the STMVP as an average of list 0 motion vectors of the two or more candidates that have the same reference picture as each other. In other examples, the STMVP may be generated as an average of the list 1 motion vectors of the two or more candidates that have the same reference picture as each other. In other examples, the STMVP may be bidirectional, a list 0 motion vector of the STMVP may be generated as an average of the list 0 motion vectors of the two or more candidates, and a list 1 motion vector of the STMVP may be generated as an average of the list 1 motion vectors of the two or more candidates.

After generating the STMVP in action (404) or action (406), video encoder 200 and video decoder 300 may code a current block of video data using the generated STMVP (408). For instance, to encode the current block of the video data using the generated STMVP, video encoder 200 may determine a prediction block based on samples in a reference picture at a location (or, in the case of a sub-PU STMVP, locations) indicated by the STMVP. Video encoder 200 may then generate residual data indicating differences between the current block and the reference block. As described elsewhere in this disclosure, video encoder 200 may apply a transform to the residual data to generate transform coefficients, quantize the transform coefficients, and entropy encode syntax elements indicating the quantized transform coefficients.

In some examples, to decode the current block of the video data using the generated STMVP, video decoder 300 may determine a prediction block based on samples in a reference picture at a location (or, in the case of a sub-PU STMVP, locations) indicated by the STMVP. Video decoder 300 may then add samples of the prediction block to residual data to reconstruct the current block.

In some examples, as part of generating the STMVP in action (406), in the case where bi-prediction is used (i.e., the video coder is generating a bi-predictive STMVP) and no candidates have the same reference picture in one direction (list 0, e.g.), but two or more candidates have the same reference picture in another direction (list 1, e.g.), video encoder 200 and video decoder 300 may generate the STMVP in the direction where no candidates have the same reference picture (list 0, e.g.) based on a single candidate's motion vector in the direction where no candidates have the same reference picture (e.g., list 0). Video encoder 200 (e.g., motion estimation unit 222 of video encoder 200) and video decoder 300 (e.g., motion compensation unit 316 of video decoder 300) may generate the STMVP in the direction where candidates have the same reference picture (e.g., list 1) based upon the candidates that have the same reference picture in the direction where the candidates have the same reference picture (e.g., list 1). In other words, in action (406), to generate a bi-predictive STMVP based on the candidates with the same reference picture when no candidates have the same list X reference picture but two or more candidates have the same list Y reference picture, a video coder may set a list X motion vector of the bi-predictive STMVP to a list X motion vector of one of the candidates and set a list Y motion vector of the bi-predictive STMVP to an average of list Y motion vectors of the two or more candidates that have the same list Y reference pictures. In this example, X is equal to 0 or 1 and Y is equal to 1-X.

Referring back to FIG. 13, in one example, the STMVP is derived from one above candidate of 6 or 2, one left candidate of 5 or 1, and a TMVP. In this example, video encoder 200 (e.g., motion estimation unit 222 of video encoder 200) and video decoder 300 (e.g., motion compensation unit 316 of video decoder 300) may select the first available above candidate, from 6 or 2, that has the same reference picture as the TMVP. If the TMVP uses bi-direction prediction, video encoder 200 and video decoder 300 may select the candidate, from among 6 or 2, that has the same reference pictures in both directions. Video encoder 200 (e.g., motion estimation unit 222 of video encoder 200) and video decoder 300 (e.g., motion compensation unit 316 of video decoder 300) may select the first available left candidate, from 5 or 1, that has the same reference picture(s) as the TMVP. Video encoder 200 (e.g., motion estimation unit 222 of video encoder 200) and video decoder 300 (e.g., motion compensation unit 316 of video decoder 300) may generate the STMVP by averaging the first available above candidate, the first available left candidate, and the TMVP. If only one of the candidates has the same reference picture(s) as the TMVP, video encoder 200 (e.g., motion estimation unit 222 of video encoder 200) and video decoder 300 (e.g., motion compensation unit 316 of video decoder 300) may average the candidate and the TMVP. If no candidate has the same reference picture(s) as the TMVP, video encoder 200 (e.g., motion estimation unit 222 of video encoder 200) and video decoder 300 (e.g., motion compensation unit 316 of video decoder 300) may use one motion vector, such as the TMVP motion vector. The order in which video encoder 200 and video decoder 300 may check the above and left candidates to see if they have the same reference picture(s) as the TMVP may be pre-defined in both video encoder 200 and video decoder 300.

In some examples, if video encoder 200 and video decoder 300 determine that none of the spatial candidates have the same reference picture(s) as the TMVP or that the TMVP is not available, video encoder 200 (e.g., motion estimation unit 222 of video encoder 200) and video decoder 300 (e.g., motion compensation unit 316 of video decoder 300) may derive the STMVP from two spatial candidates that have the same reference picture(s). For example, in FIG. 15, video encoder 200 (e.g., motion estimation unit 222 of video encoder 200) and video decoder 300 (e.g., motion compensation unit 316 of video decoder 300) may select the first available left candidate from 5 or 1 that has the same reference picture(s) as candidate 6, then derive the STMVP from the left candidate and candidate 6. If video encoder 200 and video decoder 300 determine that none of the left candidates have the same reference picture(s) as candidate 6, video encoder 200 (e.g., motion estimation unit 222 of video encoder 200) and video decoder 300 (e.g., motion compensation unit 316 of video decoder 300) may select the first available left candidate from 5 or 1 using that have the same reference picture(s) as candidate 2 and derive the STMVP from the left candidate and candidate 2. In another example, video encoder 200 (e.g., motion estimation unit 222 of video encoder 200) and video decoder 300 (e.g., motion compensation unit 316 of video decoder 300) may select the first available above candidate from 6 or 2 using the same reference picture(s) as candidate 5 and derive the STMVP from the above candidate and candidate 5. If video encoder 200 and video decoder 300 determine that none of the above candidates have the same references as candidate 5, video encoder 200 (e.g., motion estimation unit 222 of video encoder 200) and video decoder 300 (e.g., motion compensation unit 316 of video decoder 300) may select the first available left candidate from 6 or 2 that has the same reference picture(s) as candidate 1 and derive the STMVP from the above candidate and candidate 1. The order in which video encoder 200 and video decoder 300 may check the above and left candidates to see if they have the same reference picture(s) as the TMVP may be predefined in both video encoder 200 and video decoder 300.

In some examples, where bi-prediction is used, video encoder 200 and video decoder 300 may derive the STMVP in the two directions separately. For example, video encoder 200 (e.g., motion estimation unit 222 of video encoder 200) and video decoder 300 (e.g., motion compensation unit 316 of video decoder 300) may derive the STMVP for the list 0 direction, select the first above available candidate from 6 or 2 that has the same reference picture in list 0 as the TMVP. Video encoder 200 (e.g., motion estimation unit 222 of video encoder 200) and video decoder 300 (e.g., motion compensation unit 316 of video decoder 300) may select the first available left candidate, from 5 or 1, that has the same reference picture in list 0 as the TMVP. Video encoder 200 (e.g., motion estimation unit 222 of video encoder 200) and video decoder 300 (e.g., motion compensation unit 316 of video decoder 300) may generate the STMVP in the list 0 direction by averaging the selected above candidate, the selected left candidate and the TMVP in the list 0 direction. If only one of the candidates has the same reference picture as the TMVP in the list 0 direction, video encoder 200 (e.g., motion estimation unit 222 of video encoder 200) and video decoder 300 (e.g., motion compensation unit 316 of video decoder 300) may average the candidate and the TMVP in the list 0 direction. If no candidate has the same reference picture as the TMVP in the list 0 direction, video encoder 200 (e.g., motion estimation unit 222 of video encoder 200) and video decoder 300 (e.g., motion compensation unit 316 of video decoder 300) may use one motion vector in the list 0 direction, such as the TMVP motion vector in the list 0 direction. Video encoder 200 (e.g., motion estimation unit 222 of video encoder 200) and video decoder 300 (e.g., motion compensation unit 316 of video decoder 300) may derive the STMVP in the list 1 direction in the same way. The order in which video encoder 200 and video decoder 300 may check the above and left candidates to see if they have the same reference picture(s) as the TVMP may be predefined in both video encoder 200 and video decoder 300.

In other examples, when bi-prediction is used, if video encoder 200 and video decoder 300 determine that none of the spatial candidates have the same reference picture in the list 0 direction of list 1 direction as the TMVP or that the TMVP is not available, video encoder 200 (e.g., motion estimation unit 222 of video encoder 200) and video decoder 300 (e.g., motion compensation unit 316 of video decoder 300) may derive the STMVP from two spatial candidates. For example, video encoder 200 (e.g., motion estimation unit 222 of video encoder 200) and video decoder 300 (e.g., motion compensation unit 316 of video decoder 300) may select the first available left candidate from 5 or 1 that has the same reference picture as candidate 6 in the list 0 direction, then derive the STMVP in the list 0 direction from the left candidate and candidate 6. If none of the left candidates have the same reference pictures as candidate 6, video encoder 200 (e.g., motion estimation unit 222 of video encoder 200) and video decoder 300 (e.g., motion compensation unit 316 of video decoder 300) may select the first available left candidate from 5 or 1 that has the same reference picture as candidate 2 in the list 0 direction, then derive the STMVP in the list 0 direction from the left candidate and candidate 2. Video encoder 200 (e.g., motion estimation unit 222 of video encoder 200) and video decoder 300 (e.g., motion compensation unit 316 of video decoder 300) may derive the STMVP in the list 1 direction in the same way.

In another example, video encoder 200 (e.g., motion estimation unit 222 of video encoder 200) and video decoder 300 (e.g., motion compensation unit 316 of video decoder 300) may select the first available above candidate of 6 or 2 that has the same reference as candidate 5 in the list 0 direction and then derive the STMVP in the list 0 direction from the above candidate and candidate 5. If video encoder 200 and video decoder 300 determine that none of the above candidates have the same references as candidate 5, video encoder 200 (e.g., motion estimation unit 222 of video encoder 200) and video decoder 300 (e.g., motion compensation unit 316 of video decoder 300) may select the first available left candidate of 6 or 2 that has the same reference as candidate 1 in the list 0 direction and derive the STMVP in the list 0 direction from the above candidate and candidate 1. Video encoder 200 (e.g., motion estimation unit 222 of video encoder 200) and video decoder 300 (e.g., motion compensation unit 316 of video decoder 300) may derive the STMVP in the list 1 direction in the same way. The order in which video encoder 200 and video decoder 300 may check the above and left candidates to see if they have the same reference picture(s) as the TVMP may be predefined in both video encoder 200 and video decoder 300.

In another example of motion vector predictor list generation, in merge mode, video encoder 200 (e.g., motion estimation unit 222 of video encoder 200) and video decoder 300 (e.g., motion compensation unit 316 of video decoder 300) may select the first 2 available candidates in the merge list that have the same reference picture(s) as the TMVP.

Video encoder 200 (e.g., motion estimation unit 222 of video encoder 200) and video decoder 300 (e.g., motion compensation unit 316 of video decoder 300) may then generate the STMVP by averaging the first two candidates with the same reference picture(s) as the TMVP and the TMVP itself. If video encoder 200 and video decoder 300 determine that only one of the candidates has the same reference picture as the TMVP, video encoder 200 (e.g., motion estimation unit 222 of video encoder 200) and video decoder 300 (e.g., motion compensation unit 316 of video decoder 300) may generate the STMVP is by average the candidate and the TMVP. If video encoder 200 and video decoder 300 determine that none of the candidates have the same reference picture as the TMVP, video encoder 200 (e.g., motion estimation unit 222 of video encoder 200) and video decoder 300 (e.g., motion compensation unit 316 of video decoder 300) may generate the STMVP from a single motion vector, such as the TMVP motion vector. The order in which video encoder 200 and video decoder 300 may check the merge candidates to see if they have the same reference picture(s) as the TVMP may be predefined in both video encoder 200 and video decoder 300. For example, the order may be in the same as the order of candidates in merge list, or a different order of the candidates in the merge list, such as the reverse order of the candidates in the merge list.

In another example, using bi-prediction to generate the motion vector predictor list, video encoder 200 (e.g., motion estimation unit 222 of video encoder 200) and video decoder 300 (e.g., motion compensation unit 316 of video decoder 300) may derive the STMVP in the two directions separately. For example, in merge mode, video encoder 200 (e.g., motion estimation unit 222 of video encoder 200) and video decoder 300 (e.g., motion compensation unit 316 of video decoder 300) may select a first set of candidates including the first 2 available candidates in the merge list that have the same reference picture as the TMVP in the list 0 direction. Video encoder 200 (e.g., motion estimation unit 222 of video encoder 200) and video decoder 300 (e.g., motion compensation unit 316 of video decoder 300) may generate the STMVP in the list 0 direction by averaging the 3 candidates namely, the first 2 available candidates in the merge list that have the same reference picture as the TMVP in the list 0 direction and the TMVP itself in the list 0 direction. If video encoder 200 and video decoder 300 determine that only one of the candidates has the same reference picture as the TMVP in the list 0 direction, video encoder 200 (e.g., motion estimation unit 222 of video encoder 200) and video decoder 300 (e.g., motion compensation unit 316 of video decoder 300) may generate the STMVP is by averaging the candidate and the TMVP. If video encoder 200 and video decoder 300 determine that none of the candidates have the same reference picture as the TMVP, video encoder 200 (e.g., motion estimation unit 222 of video encoder 200) and video decoder 300 (e.g., motion compensation unit 316 of video decoder 300) may generate the STMVP from a single motion vector, such as the TMVP motion vector. The order in which video encoder 200 and video decoder 300 may check the merge candidates to see if they have the same reference picture(s) as the TVMP may be predefined in both video encoder 200 and video decoder 300. For example, the order may be the same as the order of candidates in the merge list, or a different order of the candidates in the merge list, such as the reverse order of the candidates in the merge list. Video encoder 200 (e.g., motion estimation unit 222 of video encoder 200) and video decoder 300 (e.g., motion compensation unit 316 of video decoder 300) may derive the STMVP in the list 1 direction in the same way but using a second set of candidates which may or may not be the same as the first set of candidates.

In another example, video encoder 200 (e.g., motion estimation unit 222 of video encoder 200) and video decoder 300 (e.g., motion compensation unit 316 of video decoder 300) may derive the STMVP from candidates in the HMVP table and the TMVP. Video encoder 200 (e.g., motion estimation unit 222 of video encoder 200) and video decoder 300 (e.g., motion compensation unit 316 of video decoder 300) may select the first 2 available candidates in the HMVP table that have the same reference picture(s) as the TMVP. Video encoder 200 (e.g., motion estimation unit 222 of video encoder 200) and video decoder 300 (e.g., motion compensation unit 316 of video decoder 300) may then generate the STMVP by averaging the 3 candidates, namely, the first 2 available candidates in the HMVP table that have the same reference picture as the TMVP and the TMVP itself. If video encoder 200 and video decoder 300 determine that only one of the candidates in the HMVP table has the same reference picture(s) as the TMVP, video encoder 200 (e.g., motion estimation unit 222 of video encoder 200) and video decoder 300 (e.g., motion compensation unit 316 of video decoder 300) may generate the STMVP by averaging the candidate and the TMVP. If video encoder 200 and video decoder 300 determine that none of the candidates in the HMVP table has the same reference picture as the TMVP, video encoder 200 (e.g., motion estimation unit 222 of video encoder 200) and video decoder 300 (e.g., motion compensation unit 316 of video decoder 300) may generate the STMVP from a single motion vector, such as the TMVP motion vector. The order in which video encoder 200 and video decoder 300 may check the HMVP candidates to determine if the HMVP candidates have the same reference picture(s) as the TVMP may be predefined in both video encoder 200 and video decoder 300. For example, the order may be the same as the order of candidates in HMVP table, or the reverse order of the candidates in the HMVP table.

In one example, using bi-prediction to generate the motion vector predictor list generation is in bi-prediction, video encoder 200 (e.g., motion estimation unit 222 of video encoder 200) and video decoder 300 (e.g., motion compensation unit 316 of video decoder 300) may derive STMVP from candidates in the HMVP table and TMVP in the two directions separately. For example, video encoder 200 (e.g., motion estimation unit 222 of video encoder 200) and video decoder 300 (e.g., motion compensation unit 316 of video decoder 300) may select the first 2 available candidates in the HMVP table that have the same reference picture as the TMVP in the list 0 direction. Video encoder 200 (e.g., motion estimation unit 222 of video encoder 200) and video decoder 300 (e.g., motion compensation unit 316 of video decoder 300) may generate the STMVP in the list 0 direction by averaging the 3 candidates, namely, the first 2 available candidates in the HMVP table that have the same reference picture as the TMVP in the list 0 direction and the TMVP itself. If video encoder 200 and video decoder 300 determine that only one of the candidates in the HMVP table has the same reference picture in the list 0 direction as the TMVP, video encoder 200 (e.g., motion estimation unit 222 of video encoder 200) and video decoder 300 (e.g., motion compensation unit 316 of video decoder 300) may generate the STMVP by averaging the candidate and the TMVP. If video encoder 200 and video decoder 300 determine that none of the candidates in the HMVP table have the same reference picture in the list 0 direction as the TMVP, video encoder 200 and video decoder 300 may generate the STMVP from a single motion vector, such as the TMVP motion vector. The order in which video encoder 200 and video decoder 300 may check the HMVP candidates to see if the HMVP candidates have the same reference picture in the list 0 direction as the TMVP may be predefined in both video encoder 200 and video decoder 300. For example, the order may be the same as the order of candidates in HMVP table, or the reverse order of the candidates in the HMVP table. Video encoder 200 (e.g., motion estimation unit 222 of video encoder 200) and video decoder 300 (e.g., motion compensation unit 316 of video decoder 300) may derive the STMVP in the list 1 direction in the same way.

In some examples, video encoder 200 and video decoder 300 use different spatial candidates than those discussed above. Referring to FIG. 12, video encoder 200 and video decoder 300 may select the spatial candidates from any neighboring position, not just the adjacent positions of Group 1. For example, video encoder 200 and video decoder 300 may use spatial candidates in Group 2, Group 3, Group 4 and/or Group 5. The spatial candidates that video encoder 200 and video decoder 300 may use may be predefined at both the encoder side (e.g., video encoder 200) and the decoder side (e.g., video decoder 300) or may be transmitted from video encoder 200 to video decoder 300 in parameter sets.

In some examples, the positions of the TMVP used by video encoder 200 and video decoder 300 for deriving the STMVP can be the same as the positions of the TMVP defined in HEVC. In other examples, the positions of the TMVP used by video encoder 200 and video decoder 300 for deriving the STMVP can be different from the positions of the TMVP defined in HEVC. In some examples, video encoder 200 and video decoder 300 derive the TMVP from a predefined corresponding block. The positions of the TMVP used by video encoder 200 and video decoder 300 to derive the STMVP can be predefined at both the encoder side (e.g., video encoder 200) and the decoder side (e.g., video decoder 300) or may be transmitted from video encoder 200 to video decoder 300 in parameter sets.

In some examples, video encoder 200 and video decoder 300 may derive more than one STMVP candidate. For example, video encoder 200 and video decoder 300 may derive a first STMVP and a second STMVP and include both in the candidate list. These STMVP candidates may be derived according to any of the techniques of this disclosure.

In some examples, the position of STMVP in the motion vector predictor list, such as a merge list, may be a predefined position at both the encoder side (e.g., video encoder 200) and the decoder side (e.g., video decoder 300) or may be transmitted from video encoder 200 to video decoder 300 in parameter sets. For example, video encoder 200 and video decoder 300 may add the STMVP to the motion vector predictor list after the advanced TMVP.

In some examples, the set of positions of candidates that video encoder 200 and video decoder 300 use to generate the STMVP, the position of the STMVP in the motion vector predictor list, and the number of STMVP candidates may be predefined in both the encoder side (e.g., video encoder 200) and decoder side (e.g., video decoder 300) or may be signaled by video encoder 200 to video decoder 300 via the sequence parameter set (SPS), the picture parameter set (PPS), the slice header, or at the CU level.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
generating a merge candidate list;
determining whether two or more candidates in the candidate list have a same reference picture;
generating a spatial-temporal motion vector predictor (STMVP) based on the two or more candidates in the candidate list that have the same reference picture, wherein generating the STMVP comprises:
selecting two candidates in the candidate list having a same reference picture as a temporal motion vector predictor (TMVP); and
generating the STMVP based on the TMVP and the two selected candidates; and
coding a current block of the video data using the STMVP.

2. The method of claim 1, wherein the STMVP is a first STMVP and the TMVP is a first TMVP, the method further comprising:
generating a second candidate list, wherein the second candidate list includes a second TMVP;
generating a second STMVP based on an average of the second TMVP and one or more of (i) a candidate in the second candidate list that is derived from a first neighboring block that is above a second block of the video data, or (ii) a candidate in the second candidate list that is derived from a second neighboring block that is left of the second block,
wherein the first neighboring block is a first-available block among a set of neighboring blocks above the second block that has a same reference picture as the second TMVP, and
wherein the second neighboring block is a first-available block among a set of neighboring blocks left of the second block that has the same reference picture as the second TMVP.

3. The method of claim 1, wherein the STMVP is a first STMVP and the TMVP is a first TMVP, the method further comprising:
generating a second candidate list; and
generating a second STMVP, wherein generating the second STMVP comprises:
based on there being no spatial candidate in the second candidate list that has a same reference picture as a second TMVP for a second block of the video data or the second TMVP being unavailable, generating the second STMVP based on an average of two spatial candidates in the second candidate list that have a same reference picture as each other.

4. The method of claim 1, wherein the STMVP is bi-directional and generating the STMVP comprises deriving the STMVP in each direction separately.

5. The method of claim 1, wherein the STMVP is a first STMVP and the TMVP is a first TMVP, the method further comprising:
generating a second candidate list;
generating a bi-directional STMVP comprising:
based on there being no spatial candidates in the second candidate list that have a same reference picture as a second TMVP of a second block of the video data or based on the second TMVP being unavailable:
generating a list 0 motion vector of the bi-directional STMVP based on an average of list 0 motion vectors of two spatial candidates in the second candidate list having a same reference picture as each other; and
generating a list 1 motion vector of the bi-directional STMVP based on an average of list 1 motion vectors of two spatial candidates in the second candidate list having a same reference picture as each other.

6. The method of claim 1, wherein the STMVP is a first STMVP and the TMVP is a first TMVP, the method further comprising:
generating a second candidate list;
generating a bi-directional STMVP comprising:
selecting a first set of up to two candidates in the second candidate list that occur first in the second candidate list according to an order having a same reference picture as a second TMVP in a list 0 direction;
selecting a second set of up to two candidates in the second candidate list that occur first in the second candidate list according to the order or a different order having a same reference picture as the second TMVP in a list 1 direction;
generating a list 0 motion vector of the bi-directional STMVP based on one or more of a list 0 motion vector of the second TMVP and motion vectors of the candidates in the first set of candidates; and
generating a list 1 motion vector of the second STMVP based on one or more of a list 1 motion vector of the second TMVP and motion vectors of the candidates in the second set of candidates.

7. The method of claim 1, wherein the STMVP is a first STMVP and the TMVP is a first TMVP, the method further comprising:
generating a second STMVP comprising:
deriving the second STMVP from one or more candidates in a history-based motion vector prediction (HMVP) table and a second TMVP.

8. The method of claim 1, wherein the STMVP is a first STMVP and the TMVP is a first TMVP, the method further comprising:
generating a second candidate list;
generating a second STMVP comprising:
generating a list 0 motion vector of the second STMVP and a list 1 motion vector of the second STMVP separately based on one or more candidates in a history-based motion vector prediction (HMVP) table and a second TMVP.

9. The method of claim 1, wherein generating the candidate list comprises generating the candidate list from motion information of blocks at a set of predefined positions.

10. The method of claim 1, wherein generating the candidate list comprises generating the candidate list from motion information of blocks at a set of positions signaled in a bitstream that comprises an encoded representation of the video data.

11. The method of claim 1, wherein the STMVP is a first STMVP and the method further comprises:
generating a second STMVP; and
including the first STMVP and the second STMVP in the candidate list.

12. The method of claim 1, further comprising:
including the STMVP at a predefined position in the candidate list.

13. The method of claim 1, further comprising:
including the STMVP at a position in the candidate list, wherein the position is signaled in a bitstream that comprises an encoded representation of the video data.

14. The method of claim 1, wherein at least one of the following is predefined in both an encoder and a decoder: the candidates upon which the STMVP is generated, a position of the STMVP in the candidate list, or a number of STMVP candidates in the candidate list.

15. The method of claim 1, wherein at least one of the following is signaled in a bitstream that comprises an encoded representation of the video data: candidates upon which the STMVP is generated, a position of the STMVP in the candidate list, or a number of STMVP candidates in the candidate list.

16. A device for coding video data comprising:
a memory configured to store a current block of the video data; and
one or more processors coupled to the memory, the one or more processors configured to:
generate a merge candidate list;
determine whether two or more candidates in the candidate list have a same reference picture;
generate a spatial-temporal motion vector predictor (STMVP) based on the two or more candidates in the candidate list that have the same reference picture, wherein as part of generating the STMVP, the one or more processors are configured to:
select two candidates in the candidate list having a same reference picture as a temporal motion vector predictor (TMVP); and
generate the STMVP based on the TMVP and the two selected candidates; and
code the current block of the video data using the STMVP.

17. The device of claim 16, wherein the STMVP is a first STMVP and the TMVP is a first TMVP, and the one or more processors are further configured to:
generate a second candidate list, wherein the second candidate list includes a second TMVP, and the one or more processors are further configured to generate a second STMVP based on an average of the second TMVP and at least one of: (i) a candidate in the second candidate list that is derived from a first neighboring block that is above a second block of the video data, or (ii) a candidate in the second candidate list that is derived from a second neighboring block that is left of the second block,
wherein the first neighboring block is a first-available block among a set of neighboring blocks above the second block that has a same reference picture as the second TMVP, and
wherein the second neighboring block is a first-available block among a set of neighboring blocks left of the second block that has the same reference picture as the second TMVP.

18. The device of claim 16, wherein the STMVP is a first STMVP and the TMVP is a first TMVP, and the one or more processors are further configured to:
generate a second candidate list; and generate a second STMVP based on an average of two spatial candidates in the second candidate list that have a same reference picture as each other when there is no spatial candidate in the second candidate list that has a same reference picture as a second TMVP for a second block of the video data or the second TMVP for the second block is unavailable.

19. The device of claim 16, wherein the one or more processors are further configured to:
generate the STMVP by deriving the STMVP in each direction separately.

20. The device of claim 16, wherein the STMVP is a first STMVP and the TMVP is a first TMVP, and the one or more processors are further configured to:
generate a second candidate list;
generate a list 0 motion vector of a bi-directional STMVP based on an average of list 0 motion vectors of two spatial candidates in the second candidate list having a same reference picture as each other; and
generate a list 1 motion vector of the bi-directional STMVP based on an average of list 1 motion vectors of two spatial candidates in the second candidate list having a same reference picture as each other when there are no spatial candidates in the second candidate list that use a same reference picture as a second TMVP of a second block of the video data or the TMVP of the second block is unavailable.

21. The device of claim 16, wherein the STMVP is a first STMVP and the TMVP is a first TMVP, and the one or more processors are further configured to:
generate a second candidate list;
select a first set of up to two candidates in the second candidate list that occur first in the second candidate list according to an order, each candidate in the first set of candidates having a same reference picture as a second TMVP in a list 0 direction;
select a second set of up to two candidates in the second candidate list that occur first in the second candidate list according to the order or a different order, each candidate in the second set of candidates having a same reference picture as the second TMVP in a list 1 direction;
generate a list 0 motion vector of a bi-directional STMVP based on one or more of a list 0 motion vector of the second TMVP and motion vectors of the candidates in the first set of candidates; and
generate a list 1 motion vector of the bi-directional STMVP based on one or more of a list 1 motion vector of the second TMVP and motion vectors of the candidates in the second set of candidates.

22. The device of claim 16, wherein the one or more processors are further configured to:
derive a second STMVP from one or more candidates in a history-based motion vector prediction (HMVP) table and a second TMVP.

23. The device of claim 16, wherein the one or more processors are further configured to:
generate a list 0 motion vector of a bi-directional STMVP and a list 1 motion vector of the bi-directional STMVP separately based on one or more candidates in a history-based motion vector prediction (HMVP) table and a second TMVP.

24. The device of claim 16, wherein the one or more processors are further configured to:
generate the candidate list from motion information of blocks at a set of predefined positions.

25. The device of claim 16, wherein the one or more processors are further configured to:
generate the candidate list from motion information of blocks at a set of positions signaled in a bitstream that comprises an encoded representation of the video data.

26. The device of claim 16, wherein the STMVP is a first STMVP and the one or more processors are further configured to:
  generate a second STMVP; and
  include the first STMVP and the second STMVP in the candidate list.

27. A non-transitory computer-readable storage medium having stored thereon instructions that, when executed, cause one or more processors to:
  generate a merge candidate list;
  determine whether two or more candidates in the candidate list that have a same reference picture;
  generate a spatial-temporal motion vector predictor (STMVP) based on the candidates in the candidate list determined to have the same reference picture, wherein as part of generating the STMVP, the instructions cause the one or more processors to:
    select two candidates in the candidate list having a same reference picture as a temporal motion vector predictor (TMVP); and
    generate the STMVP based on the TMVP and the two selected candidates; and
  code a current block of video data using the STMVP.

28. A device for coding video data comprising:
  means for generating a candidate list;
  means for determining whether two or more candidates in the candidate list have a same reference picture;
  means for generating a spatial-temporal motion vector predictor (STMVP) based on the two or more candidates in the candidate list that have the same reference picture, wherein the means for generating the STMVP comprises:
    means for selecting two candidates in the candidate list having a same reference picture as a temporal motion vector predictor (TMVP); and
    means for generating the STMVP based on the TMVP and the two selected candidates; and
  means for coding a current block of the video data using the STMVP.

* * * * *